US010051228B2

(12) United States Patent
Ishihara et al.

(10) Patent No.: US 10,051,228 B2
(45) Date of Patent: *Aug. 14, 2018

(54) HOME THEATER SYSTEM, AUDIO/VIDEO PLAYBACK DEVICE, AUDIO OUTPUT CONTROL DEVICE, AND VOLUME CONTROL METHOD

(71) Applicant: PANASONIC INTELLECTUAL PROPERTY MANAGEMENT CO., LTD., Osaka (JP)

(72) Inventors: Toshihide Ishihara, Osaka (JP); Yuji Nishimura, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/651,340

(22) Filed: Jul. 17, 2017

(65) Prior Publication Data

US 2017/0318255 A1    Nov. 2, 2017

Related U.S. Application Data

(63) Continuation of application No. 13/394,943, filed as application No. PCT/JP2010/005859 on Sep. 29, 2010, now Pat. No. 9,800,820.

(30) Foreign Application Priority Data

Sep. 30, 2009  (JP) .................................. 2009-226929

(51) Int. Cl.
 H04N 21/414   (2011.01)
 H04N 21/439   (2011.01)
 (Continued)

(52) U.S. Cl.
 CPC ......... *H04N 5/607* (2013.01); *H04N 21/4122* (2013.01); *H04N 21/42204* (2013.01);
 (Continued)

(58) Field of Classification Search
 None
 See application file for complete search history.

(56) References Cited

U.S. PATENT DOCUMENTS

2005/0027884 A1   2/2005   Yanoguchi et al.
2006/0146032 A1   7/2006   Kajimoto et al.
(Continued)

FOREIGN PATENT DOCUMENTS

EP    1505828    2/2005
EP    1931140    6/2008
(Continued)

OTHER PUBLICATIONS

Search report from E.P.O., dated Sep. 12, 2012.
Japan Office action, dated Jul. 23, 2013.

*Primary Examiner* — Nnenna Ekpo
*Assistant Examiner* — Jean D Saint Cyr
(74) *Attorney, Agent, or Firm* — Greenblum & Bernstein, P.L.C.

(57) ABSTRACT

A CPU in a home theater device transmits current sound volume control status data to a digital television receiving device when a theater mode is set. A CPU in the digital television receiving device updates, when the sound volume control status data has been received from the home theater device, sound volume control status data stored in a memory with the received sound volume control status data. A CPU in the digital television receiving device determines sound volume setting value data after an operation based on sound volume operation information fed from a remote control device and the sound volume control status data stored in the
(Continued)

memory, and transmits a CEC command including the determined sound volume setting value data to the home theater device while displaying a ratio of the current sound volume to a maximum value in a sound volume adjustable range of the home theater device on a display.

3 Claims, 14 Drawing Sheets

(51) Int. Cl.
    *H04N 21/485* (2011.01)
    *H04N 21/81* (2011.01)
    *H04N 5/60* (2006.01)
    *H04N 21/41* (2011.01)
    *H04N 21/422* (2011.01)

(52) U.S. Cl.
    CPC ....... *H04N 21/439* (2013.01); *H04N 21/4852* (2013.01); *H05K 999/99* (2013.01); *H04N 21/485* (2013.01)

(56) References Cited

U.S. PATENT DOCUMENTS

| | | |
|---|---|---|
| 2006/0287851 A1* | 12/2006 | Kida .................. G08C 23/04 704/201 |
| 2007/0201705 A1 | 8/2007 | Dorogusker et al. |
| 2008/0144860 A1 | 6/2008 | Haller et al. |
| 2008/0309830 A1 | 12/2008 | Motomura |
| 2009/0046210 A1* | 2/2009 | Sakamoto ........... H04L 12/2809 348/738 |
| 2009/0086099 A1 | 4/2009 | Higaki |
| 2009/0262256 A1* | 10/2009 | Asayama ................. H04N 5/60 348/738 |
| 2009/0316931 A1 | 12/2009 | Dai et al. |
| 2010/0014004 A1 | 1/2010 | Dai |
| 2010/0124338 A1* | 5/2010 | Lee .......................... H04R 5/02 381/74 |
| 2011/0285921 A1 | 11/2011 | Asayama et al. |
| 2012/0070017 A1 | 3/2012 | Dorogusker et al. |
| 2012/0182478 A1 | 7/2012 | Lee |

FOREIGN PATENT DOCUMENTS

| | | |
|---|---|---|
| JP | 04-335784 | 11/1992 |
| JP | 11-275684 | 10/1999 |
| JP | 2006-352599 | 12/2006 |
| JP | 2008-294759 | 12/2008 |
| JP | 2009-027678 | 2/2009 |
| JP | 2009-58845 | 3/2009 |
| JP | 2009-088646 | 4/2009 |
| WO | 2007-037208 | 4/2007 |

* cited by examiner

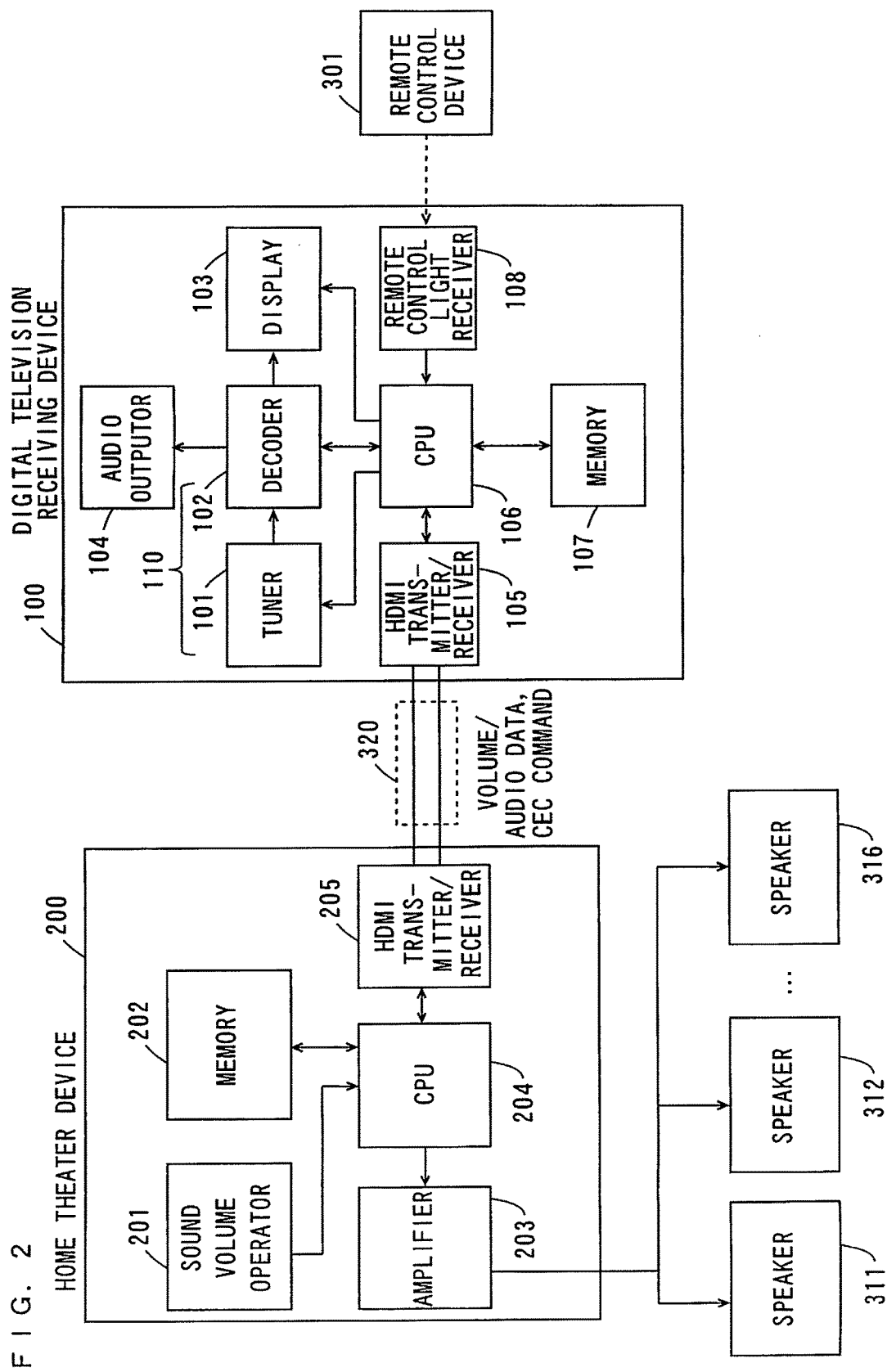
F I G. 2

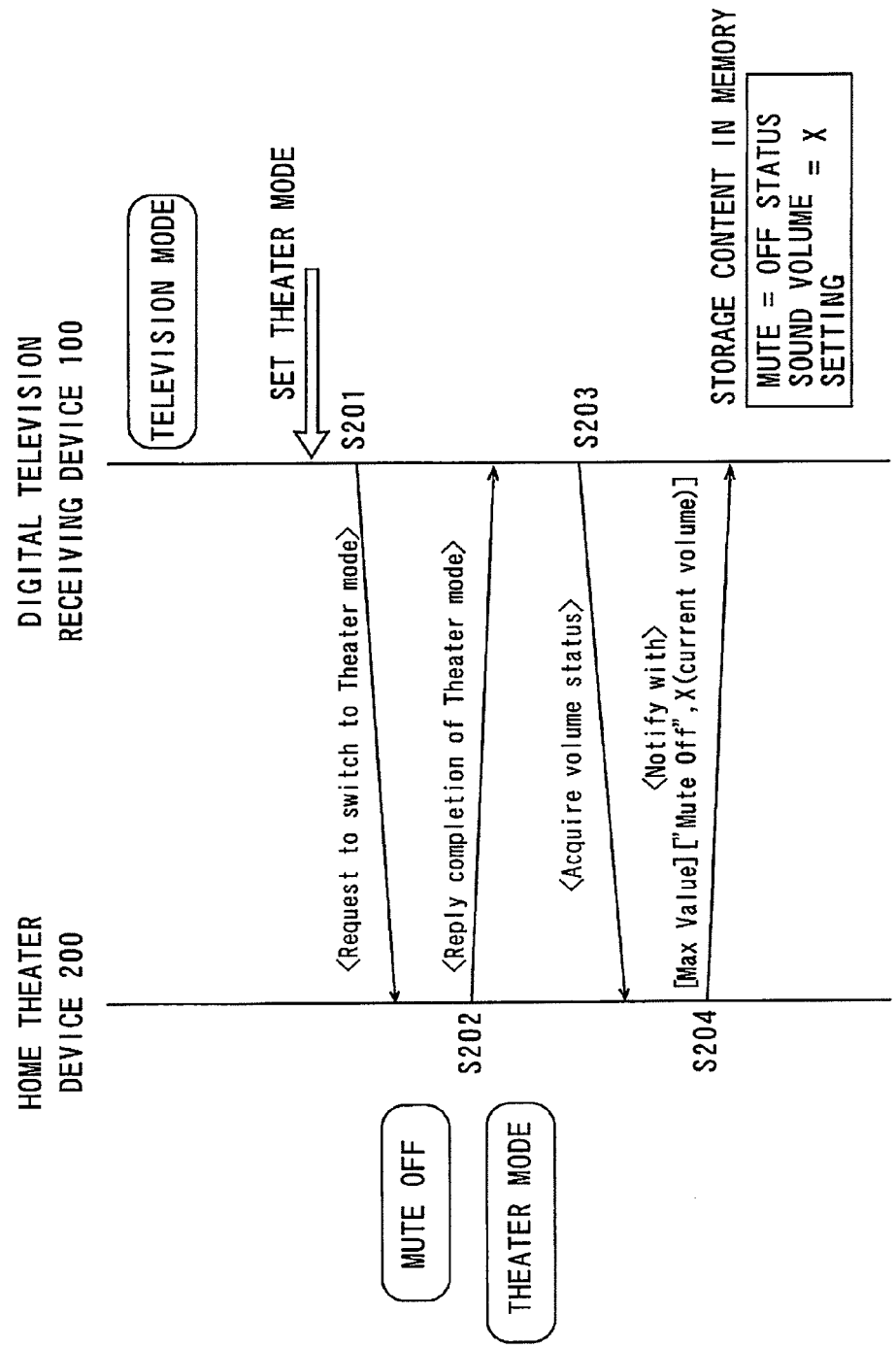
F I G. 4

FIG. 11 <REFERENCE EXAMPLE: SOUND VOLUME ADJUSTING OPERATION BY LONG PRESSING>

HOME THEATER SYSTEM, AUDIO/VIDEO PLAYBACK DEVICE, AUDIO OUTPUT CONTROL DEVICE, AND VOLUME CONTROL METHOD

CROSS-REFERENCE TO RELATED APPLICATIONS

This is a continuation application of pending U.S. patent application Ser. No. 13/394,943, filed on Mar. 30, 2012, which is a U.S. National Stage Application of International Application PCT/JP2010/005859, filed Sep. 29, 2010, which claims priority to Japan Application No. 2009-226929 filed Sep. 30, 2009. The disclosures of these documents, including the specifications, drawings and claims, are incorporated herein by reference in their entirety.

TECHNICAL FIELD

The present invention relates to a home theater system, an audio/video reproduction device, and an audio output control device, and a volume control method therefor.

BACKGROUND ART

In digital television broadcasting such as terrestrial digital broadcasting or digital satellite broadcasting, high-definition video signals called Hi-vision video signals are transmitted. Audio signals transmitted in the digital television broadcasting are conformable to stereophonic reproduction called surround. More specifically, such audio signals enable stereophonic reproduction using a 5.1 channel surround system.

A 5.1 channel includes a total of five speakers (five channels) including front (left and right) speakers, a center speaker, and surround (left and right) speakers, and a ultrasonic subwoofer speaker (0.1 channels).

In a home theater system conformable to the 5.1 channel surround system, a digital broadcasting conformable television receiver (hereinafter referred to as a digital television receiving device) having a display screen on a front surface of a user is installed. The front speakers are respectively installed on the right and left sides ahead of a user. The center speaker is arranged on the front surface of the user. The subwoofer speaker is installed in a suitable location ahead of the user. The surround speakers are respectively installed on the right and left sides behind the user.

In order to reproduce audio in the digital television broadcasting using the 5.1 channel surround system, a home theater device having a built-in amplifier is connected to the digital television receiving device via an HDMI cable conforming to a HDMI (High-Definition Multimedia Interface) standard. The HDMI cable includes a data line for transmitting and receiving video/audio data (video data and audio data) and a CEC signal line for transmitting and receiving a CEC (Consumer Electronic Control) command for performing control between devices. The six speakers, described above, are connected to the home theater device.

A method for improving an audio reproduction function using the CEC command conforming to the HDMI standard has conventionally been proposed.

In an audio control system discussed in Patent Document 1, for example, a control signal is transmitted to an AV (Audio Visual) amplifier via an HDMI CEC line depending on whether a headphone is connected to a television receiver. Thus, control is performed depending on whether audio can be output.

In a sound volume correction circuit system discussed in Patent Document 2, a control signal is transmitted from an HDMI compatible STB (Set Top Box) to an HDMI conformable television via an HDMI cable. Thus, an amplification degree of an audio signal of a television is adjusted depending on the type of the STB.

Further, Patent Document 3 discusses an output device to which a plurality of external devices including an HDMI source device are connected. If an HDMI signal input to the HDMI source device does not include an audio signal, a sound volume operation by an operator in the output device is invalidated.

[Patent Document 1] JP 2009-027678 A
[Patent Document 2] JP 2006-352599 A
[Patent Document 3] JP 2009-088646 A

SUMMARY OF INVENTION

Technical Problem

As described above, various audio reproduction functions by transmitting and receiving a CEC command between devices connected via an HDMI have been discussed. In a home theater system, however, a technique for enabling improvements in operability and responsibility of a sound volume operation as well as high-precision sound volume adjustment is not discussed.

An object of the present invention is to provide a home theater system enabling improvements in operability and responsibility of a sound volume operation and high-precision sound volume adjustment, an audio/video reproduction device, and an audio output control device, and a volume control method.

Solution to Problem (1) According to an aspect of the present invention, a home theater system includes an audio/video reproduction device, a display that displays a video, and an audio output control device connected to the audio/video reproduction device via a communication medium, in which the audio/video reproduction device includes an audio data acquisitor that acquires audio data, a sound volume operation information acquisitor that acquires sound volume operation information representing a sound volume operation of the audio output control device, a first transmitter/receiver that transmits the audio data acquired by the audio data acquisitor to the audio output control device via the communication medium, and transmits and receives a command to and from the audio output control device via the communication medium, a storage that stores sound volume control status data relating to sound volume control of the audio output control device, and a first controller that controls the display and the first transmitter/receiver, the sound volume control status data includes maximum sound volume value data representing a maximum value in a sound volume adjustable range of the audio output control device, and sound volume setting value data representing a sound volume of the audio output control device, the audio output control device includes a second transmitter/receiver that receives audio data from the audio/video reproduction device via the communication medium, and transmits and receives a command to and from the audio/video reproduction device via the communication medium, an amplifier that outputs an audio signal based on the audio data received by the second transmitter/receiver, and a second controller that controls the second transmitter/receiver and the amplifier and transmits current sound volume control status data relating to the audio output control device to the audio/video reproduction device via the second transmitter/receiver at predetermined timing, the first controller updates, when the sound volume control status data has been received from the audio output control device via the first transmitter/receiver, the sound volume control status data stored in the storage with the received sound volume control status data, determines, when sound volume operation information has been acquired by said sound volume information acquisitor, sound volume setting value data after an operation based on the acquired sound volume operation information and the sound volume control status data stored in the storage, and transmits a command including the determined sound volume setting value data to the audio output control device via the first transmitter/receiver while displaying a ratio of the current sound volume of the audio output control device to a maximum value in the sound volume adjustable range of the audio output control device based on the determined sound volume setting value data and the maximum sound volume value data stored in the storage, and the second controller controls, when the command including the sound volume setting value data has been received from the audio/video reproduction device via the second transmitter/receiver, a sound volume of the amplifier based on the received sound volume setting value data.

In the home theater system, the sound volume control status data is stored in the storage in the audio/video reproduction device. The second controller in the audio output control device transmits the current sound volume control status data in the audio output control device to the audio/video reproduction device via the second transmitter/receiver at predetermined timing.

When the first controller in the audio/video reproduction device updates, when it has received the sound volume control status data from the audio output control device via the first transmitter/receiver, the first controller updates the sound volume control status data stored in the storage with the received sound volume control status data. When the sound volume operation information acquisitor has acquired the sound volume operation information, the first controller determines the sound volume setting value data after the operation based on the acquired sound volume operation information and the sound volume control status data stored in the storage, and transmits the command including the determined sound volume setting value data to the audio output control device via the first transmitter/receiver. Further, the first controller displays the ratio of the current sound volume of the audio output control device to the maximum value in the sound volume adjustable range of the audio output control device on the display based on the determined sound volume setting value data and the maximum sound volume value data stored in the storage.

When the second controller in the audio output control device has received the command including the sound volume setting value data from the audio/video reproduction device via the second transmitter/receiver, the second controller controls the sound volume of the amplifier based on the received sound volume setting value data.

Thus, the storage in the audio/video reproduction device stores the current sound volume control status data in the audio output control device. Therefore, the first controller can recognize the current sound volume of the audio output control device from the sound volume setting value data stored in the storage during the sound volume operation. Thus, the first controller can determine the sound volume setting value data without acquiring the current sound volume from the audio output control device. Therefore, the number of times of transmission and receiving of the command between the audio/video reproduction device and the audio output control device can be reduced during the sound volume operation. As a result, the responsibility of sound volume adjustment can be increased.

The first controller can recognize the maximum value in the sound volume adjustable range of the audio output control device from the maximum sound volume value data stored in the storage. Thus, the ratio of the current sound volume of the audio output control device to the maximum value in the sound volume adjustable range of the audio output control device can be displayed on the display. Therefore, a user can grasp the current sound volume relative to the maximum sound volume of the audio output control device. As a result, the user can intuitively grasp the current sound volume regardless of the type of the audio output control device.

In this case, the first controller can display the ratio of the current sound volume without transmitting and receiving the command to and from the audio output control device. Thus, the speed of sound volume display is increased. Therefore, a change in the sound volume of the audio output control device can be instantly reflected on a change in the sound volume display on the display.

From these results, the operability and the responsibility of the sound volume operation are improved while high-precision sound volume adjustment can be made.

(2) The first controller may display the ratio of the current sound volume on the display using a bar. In this case, the user can intuitively and visually grasp the current sound volume.

(3) The bar may include a first bar having a length corresponding to the maximum value in the sound volume adjustable range of the audio output control device and a second bar having a length corresponding to the current sound volume.

In this case, the user can intuitively and visually grasp the current sound volume based on the ratio of the length of the second bar to the length of the first bar.

(4) The first controller may update the sound volume setting value data stored in the storage with the determined sound volume setting value data when the sound volume operation information is acquired by the sound volume operation information acquisitor.

Thus, when the sound volume of the audio output control device is changed by the sound volume operation, the storage stores the newest sound volume setting value data. Therefore, the continuity of the sound volume operation can be maintained.

(5) The audio/video reproduction device may be configured to be settable to a theater mode for transmitting the audio data to the audio output control device, the predetermined timing may include the time when the audio/video reproduction device is set to the theater mode, and the second controller may transmit the current sound volume control status data in the audio output control device to the audio/video reproduction device via the second transmitter/receiver when the audio/video reproduction device is set to the theater mode.

In this case, when the audio/video reproduction device is set to the theater mode, the sound volume control status data stored in the storage is updated to the newest sound volume control status data. Thus, the audio/video reproduction device can determine the sound volume setting value data and perform the sound volume display based on the newest sound volume control status data without transmitting and receiving the command to and from the sound volume output control device during the sound volume operation. As a result, high-precision sound volume adjustment can be made.

(6) The audio output control device may further include a sound volume operator used to perform a sound volume operation of the amplifier, the predetermined timing may include the time when the sound volume operator is performed by the sound volume operator, the second controller may determine, when the sound volume operator has been performed by the sound volume operator, the sound volume setting value data in the audio output control device based on the sound volume operation by the sound volume operator, and transmit a command including the determined sound volume setting value data to the audio output control device via the second transmitter/receiver, and the first controller may update, when a command including the sound volume setting value data has been received from the audio output control device via the first transmitter/receiver, the sound volume setting value data stored in the storage with the received sound volume setting value data.

By such a configuration, the sound volume operation of the audio output control device can be performed on the side of not only the audio/video reproduction device but also the audio output control device. In this case, the sound volume setting value data after the sound volume operation is transmitted from the audio output control device to the audio/video reproduction device so that the newest sound volume setting value data is stored in the storage. As a result, even when the sound volume operation is performed on the side of the audio/video reproduction device after being performed on the side of the audio output control device, the continuity of the sound volume operation can be maintained.

(7) The sound volume control status data may further include mute setting status data indicating whether the audio output control device is set to a mute status.

In this case, the first controller in the audio/video reproduction device can acquire the mute setting status data in the audio output control device simultaneously with the maximum sound volume value data and the sound volume setting value data by receiving the sound volume control status data from the audio output control device. Thus, the audio/video reproduction device can grasp the status of the audio output control device by transmitting and receiving the command a small number of times between the audio/video reproduction device and the audio output control device. As a result, operation responsibility is improved.

(8) The first controller may determine, when the sound volume operation information acquired by the sound volume operation information acquisitor represents an increase or decrease in a sound volume, the sound volume setting value data to increase or decrease by a value larger than one.

In this case, the number of times of the transmission and receiving of the sound volume setting value data is reduced so that a period of time during which the command is transmitted can be shortened. As a result, the speed of the sound volume operation can be increased.

(9) According to another aspect of the present invention, an audio/video reproduction device to be connected to an audio output control device via a communication medium and to be connected to a display includes an audio data acquisitor that acquires audio data, a sound volume operation information acquisitor that acquires sound volume operation information representing a sound volume operation of the audio output control device, a transmitter/receiver that transmits the audio data acquired by the audio data acquisitor to the audio output control device via the communication medium, and transmits and receives a command to and from the audio output control device via the communication medium, a storage that stores sound volume control status data relating to sound volume control of the audio output control device, and a controller that controls the display and the transmitter/receiver, in which the sound volume control status data includes maximum sound volume value data representing a maximum value in a sound volume adjustable range of the audio output control device and sound volume setting value data representing a sound volume of the audio output control device, and the controller updates, when sound volume control status data has been received from the audio output control device via the transmitter/receiver, the sound volume control status data stored in the storage with the received sound volume control status data, determines, when the sound volume operation information has been received acquired by the sound volume operation information acquisitor, sound volume setting value data after an operation based on the acquired sound volume operation information and the sound volume control status data stored in the storage, and transmits a command including the determined sound volume setting value data to the audio output control device via the first transmitter/receiver while displaying a ratio of the current sound volume of the audio output control device to the maximum value in the sound volume adjustable range of the audio output control device on the display based on the determined sound volume setting value data and the maximum sound volume value data stored in the storage.

In the audio/video reproduction device, the storage stores the current sound volume control status data in the audio output control device. Therefore, the controller can recognize the current sound volume of the audio output control device from the sound volume setting value data stored in the storage during the sound volume operation. Thus, the controller can determine the sound volume setting value data without acquiring the current sound volume from the audio output control device. Therefore, the number of times of the transmission and receiving of the command between the audio/video reproduction device and the audio output control device can be reduced during the sound volume operation. As a result, the responsibility of sound volume adjustment can be increased.

The controller can recognize the maximum value in the sound volume adjustable range of the audio output control device from the maximum sound volume value data stored in the storage. Thus, the ratio of the current sound volume of the audio output control device to the maximum value in the sound volume adjustable range of the audio output control device can be displayed on the display. Therefore, a user can grasp the current sound volume relative to the maximum sound volume of the audio output control device. As a result, the user can intuitively grasp the current sound volume regardless of the type of the audio output control device.

In this case, the controller can display the ratio of the current sound volume without transmitting and receiving the command to and from the audio output control device. Thus, the speed of sound volume display is increased. Therefore, a change in the sound volume of the audio output control device is instantly reflected on a change in the sound volume display on the display.

From these results, the operability and the responsibility of the sound volume operation are improved while high-precision sound volume adjustment can be made.

(10) According to sill another aspect of the present invention, an audio output control device to be connected to an audio/video reproduction device via a communication medium includes a transmitter/receiver that receives audio data from the audio/video reproduction device via the communication medium, and transmits and receives a command to and from the audio/video reproduction device via the communication medium, an amplifier that outputs an audio signal based on the audio data received by the transmitter/receiver, and a controller that controls the transmitter/receiver and the amplifier and transmits current sound volume control status data in the audio output control device to the audio/video reproduction device via the transmitter/receiver at predetermined timing, in which the sound volume control status data includes maximum sound volume value data representing a maximum value in a sound volume adjustable range of the audio output control device and sound volume setting value data representing a sound volume of the audio output control device, and the controller controls, when a command including sound volume setting value data has been received from the audio/video reproduction device via the transmitter/receiver, a sound volume of the amplifier based on the received sound volume setting value data.

According to the audio output control device, the audio/video reproduction device can store the current sound volume control status data in the audio output control device. Therefore, the audio/video reproduction device can recognize the current sound volume of the audio output control device from the stored sound volume setting value data during a sound volume operation. Thus, the audio/video reproduction device can determine the sound volume setting value data without acquiring the current sound volume from the audio output control device. Therefore, the number of times of the transmission and receiving of the command between the audio/video reproduction device and the audio output control device can be reduced during the sound volume operation. As a result, the responsibility of sound volume adjustment can be increased.

The audio/video reproduction device can recognize the maximum value in the sound volume adjustable range of the audio output control device from the stored maximum sound volume value data. Thus, the audio/video reproduction device can display the ratio of the current sound volume of the audio output control device to the maximum value in the sound volume adjustable range of the audio output control device on the display. Therefore, a user can grasp the current sound volume relative to the maximum sound volume of the audio output control device. As a result, the user can intuitively grasp the current sound volume regardless of the type of the audio output control device.

In this case, the audio/video reproduction device can display the ratio of the current sound volume without transmitting and receiving the command to and from the audio output control device. Thus, the speed of sound volume display is increased. Therefore, a change in the sound volume of the audio output control device can be instantly reflected on a change in the sound volume display on the display.

From these results, the operability and the responsibility of the sound volume operation are improved while high-precision sound volume adjustment can be made.

(11) According to yet still another aspect of the present invention, a volume control method for controlling, in a home theater system including an audio/video reproduction device, a display, and an audio output control device connected to the audio/video reproduction device via a communication medium, a sound volume of the audio output control device includes the steps of acquiring audio data in the audio/video reproduction device, transmitting the acquired audio data to the audio output control device from the audio/video reproduction device via the communication medium, receiving the audio data from the audio/video reproduction device via the communication medium in the audio output control device, outputting an audio signal from an amplifier based on the audio data received in the audio output control device, storing in a storage sound volume control status data including maximum sound volume value data representing a maximum value in a sound volume adjustable range of the audio output control device and sound volume setting value data representing a sound volume of the audio output control device in the audio/video reproduction device, transmitting current sound volume control status data in the audio output control device from the audio output control device to the audio/video reproduction device at predetermined timing, updating, when the sound volume control status data has been received from the audio output control device in the audio/video reproduction device, the sound volume control status data stored in the storage with the received sound volume control status data, acquiring sound volume operation information representing a sound volume operation of the audio output control device in the audio/video reproduction device, determining sound volume setting value data after an operation based on the acquired sound volume operation information and the sound volume control status data stored in the storage in the audio/video reproduction device, transmitting a command including the determined sound volume setting value data from the audio/video reproduction device to the audio output control device, displaying in the display a ratio of the current sound volume of the audio output control device to a maximum value in the sound volume adjustable range of the audio output control device based on the determined sound volume setting value data and the maximum sound volume value data stored in the storage, and controlling, when the command including the sound volume setting value data has been received from the audio/video reproduction device in the audio output control device, a sound volume of the amplifier based on the received sound volume setting value data.

In the volume control method, the storage in the audio/video reproduction device stores the current sound volume control status data in the audio output control device. Therefore, the audio/video reproduction device can recognize the current sound volume of the audio output control device from the sound volume setting value data stored in the storage during the sound volume operation. Thus, the audio/video reproduction device can determine the sound volume setting value data without acquiring the current sound volume from the audio output control device. Therefore, the number of times of the transmission and receiving of the command between the audio/video reproduction device and the audio output control device can be reduced during the sound volume operation. As a result, the responsibility of sound volume adjustment can be increased.

The audio/video reproduction device can recognize the maximum value in the sound volume adjustable range of the audio output control device from the maximum sound volume value data stored in the storage. Thus, the ratio of the current sound volume of the audio output control device to the maximum value in the sound volume adjustable range of the audio output control device can be displayed on the display. Therefore, a user can grasp the current sound volume relative to the maximum sound volume of the audio output control device. As a result, the user can intuitively grasp the current sound volume regardless of the type of the audio output control device.

In this case, the audio/video reproduction device can display the ratio of the current sound volume without transmitting and receiving the command to and from the audio output control device. Thus, the speed of sound volume display is increased. Therefore, a change in the sound volume of the audio output control device can be instantly reflected on a change in the sound volume display on the display.

From these results, the operability and the responsibility of the sound volume operation are improved while high-precision sound volume adjustment can be made.

(12) According to a further aspect of the present invention, a volume control method for controlling, in an audio/video reproduction device connected to an audio output control device via a communication medium while being connected to a display, a sound volume of the audio output control device includes the steps of acquiring audio data, transmitting the acquired audio data to the audio output control device via the communication medium, storing in a storage sound volume control status data including maximum sound volume value data representing a maximum value in a sound volume adjustable range of the audio output control device and sound volume setting value data representing a sound volume of the audio output control device, updating, when sound volume control status data has been received from the audio output control device, the sound volume control status data stored in the storage with the received sound volume control status data, acquiring sound volume operation information representing a sound volume operation of the audio output control device, determining sound volume setting value data after an operation based on the acquired sound volume operation information and the sound volume control status data stored in the storage, transmitting a command including the determined sound volume setting value data to the audio output control device, and displaying a ratio of the current sound volume of the audio output control device to the maximum value in the sound volume adjustable range of the audio output control device on the display based on the determined sound volume setting value data and the maximum sound volume value data stored in the storage.

In the volume control method, the storage in the audio/video reproduction device stores the current sound volume control status data in the audio output control device. Therefore, the audio/video reproduction device can recognize the current sound volume of the audio output control device from the sound volume setting value data stored in the storage during the sound volume operation. Thus, the audio/video reproduction device can determine the sound volume setting value data without acquiring the current sound volume from the audio output control device. Therefore, the number of times of transmission and receiving of the command between the audio/video reproduction device and the audio output control device can be reduced during the sound volume operation. As a result, the responsibility of sound volume adjustment can be increased.

The audio/video reproduction device can recognize the maximum value in the sound volume adjustable range of the audio output control device from the maximum sound volume value data stored in the storage. Thus, the ratio of the current sound volume of the audio output control device to the maximum value in the sound volume adjustable range of the audio output control device can be displayed on the display. Therefore, a user can grasp the current sound volume relative to the maximum sound volume of the audio output control device. As a result, the user can intuitively grasp the current sound volume regardless of the type of the audio output control device.

In this case, the audio/video reproduction device can display the ratio of the current sound volume without transmitting and receiving the command to and from the audio output control device. Thus, the speed of sound volume display is increased. Therefore, a change in the sound volume of the audio output control device can be instantly reflected on a change in the sound volume display on the display.

From these results, the operability and the responsibility of the sound volume operation are improved while high-precision sound volume adjustment can be made.

(13) According to a still further aspect of the present invention, a volume control method for controlling a sound volume in an audio output control device connected to an audio/video reproduction device via a communication medium includes the steps of receiving audio data from the audio/video reproduction device via the communication medium, outputting an audio signal from an amplifier based on the received audio data, transmitting sound volume control status data including maximum sound volume value data representing a maximum value in a sound volume adjustable range of the audio output control device and sound volume setting value data representing a sound volume of the audio output control device to the audio/video reproduction device, and controlling, when a command including the sound volume setting value data has been received from the audio/video reproduction device, a sound volume of the amplifier based on the received sound volume setting value data.

According to the volume control method, the audio/video reproduction device can store the current sound volume control status data in the audio output control device. Therefore, the audio/video reproduction device can recognize the current sound volume of the audio output control device from the stored sound volume setting value data during the sound volume operation. Thus, the audio/video reproduction device can determine the sound volume setting value data without acquiring the current sound volume from the audio output control device. Therefore, the number of times of the transmission and receiving of the command between the audio/video reproduction device and the audio output control device can be reduced during the sound volume operation. As a result, the responsibility of sound volume adjustment can be increased.

The audio/video reproduction device can recognize the maximum value in the sound volume adjustable range of the audio output control device from the stored maximum sound volume value data. Thus, the audio/video reproduction device can display the ratio of the current sound volume of the audio output control device to the maximum value in the sound volume adjustable range of the audio output control device on the display. Therefore, a user can grasp the current sound volume relative to the maximum sound volume of the audio output control device. As a result, the user can intuitively grasp the current sound volume regardless of the type of the audio output control device.

In this case, the audio/video reproduction device can display the ratio of the current sound volume without transmitting and receiving the command to and from the audio output control device. Thus, the speed of sound volume display is increased. Therefore, a change in the sound volume of the audio output control device can be instantly reflected on a change in the sound volume display on the display.

From these results, the operability and the responsibility of the sound volume operation are improved while high-precision sound volume adjustment can be made.

Advantageous Effects of Invention

According to the present invention, the operability and the responsibility of a sound volume operation are improved while high-precision sound volume adjustment can be made.

BRIEF DESCRIPTION OF DRAWINGS

FIG. 2 is a block diagram illustrating a detailed configuration of a digital television receiving device and a home theater device in the home theater system illustrated in FIG. 1.

FIG. 4 is a sequence diagram illustrating transmission and receiving of CEC commands between the digital television receiving device and the home theater device during a theater mode setting operation.

DESCRIPTION OF EMBODIMENTS

Figure 1:
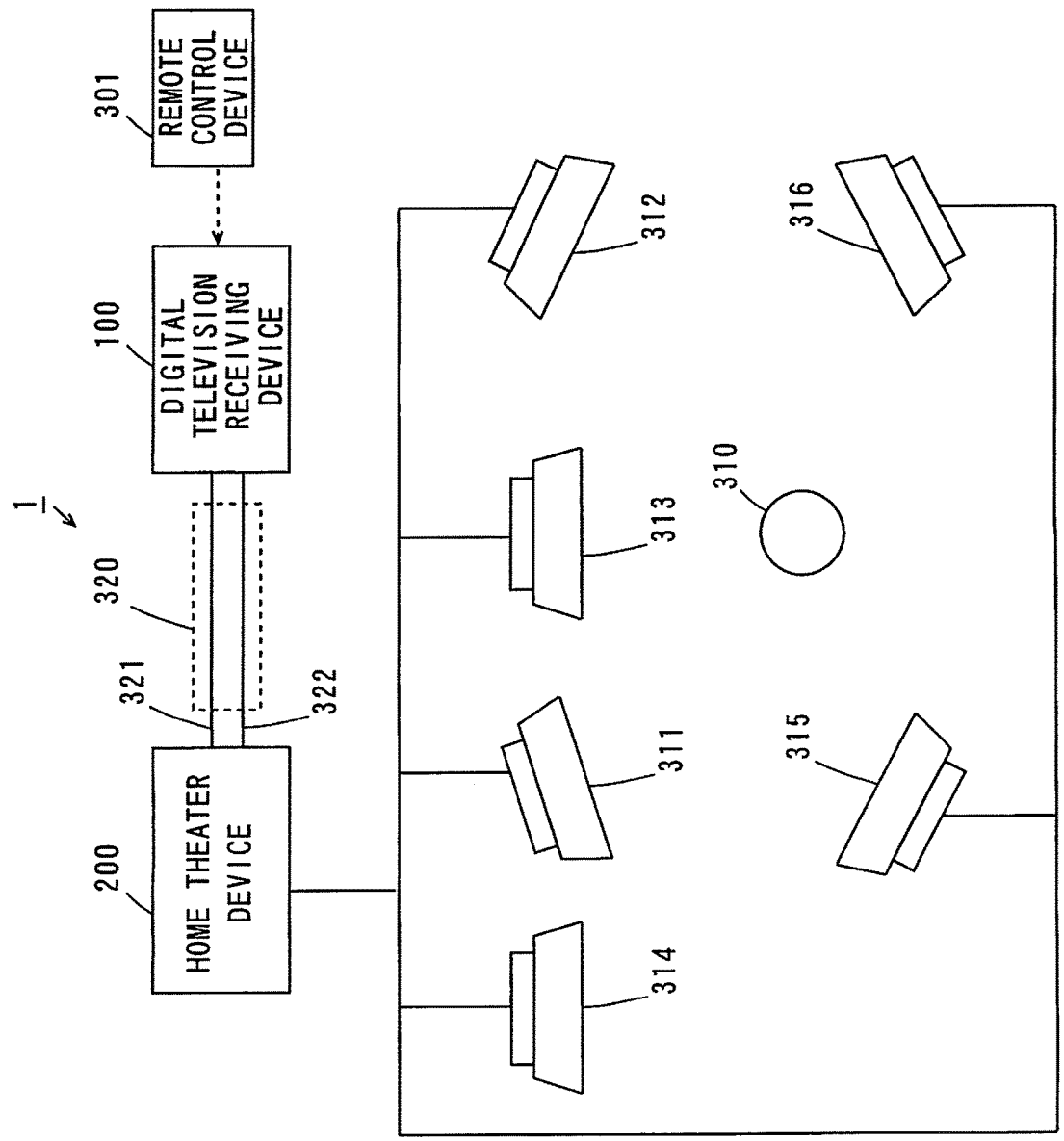
FIG. 1 is a block diagram illustrating a configuration of a home theater system according to a first embodiment of the present invention.

The embodiments of the present invention will be described in detail referring to the drawings. The embodiments below describe a home theater system.

(1) First Embodiment (1-1) Configuration of Home Theater System 1

FIG. 1 is a block diagram illustrating a configuration of a home theater system 1 according to a first embodiment of the present invention. FIG. 1 illustrates a home theater system 1 that is conformable to a 5.1 channel surround system arranged in a room.

In FIG. 1, a digital broadcasting conformable television receiver (hereinafter referred to as a digital television receiving device) 100 having a display screen is installed on a front surface of a user 310. Front speakers 311 and 312 are installed on the left and right sides ahead of the user 310. A center speaker 313 is arranged on the front surface of the user 310. A subwoofer speaker 314 is installed in a suitable location ahead of the user 310. Surround speakers 315 and 316 are respectively installed on the left and the right behind the user 310.

The front speakers 311 and 312, the center speaker 313, the subwoofer speaker 314, and the surround speakers 315 and 316 are hereinafter merely abbreviated as speakers 311 to 316 if they need not be distinguished.

The digital television receiving device 100 contains two small-sized speakers for stereo reproduction. In order to reproduce an audio of digital television broadcasting using the 5.1 channel surround system, a home theater device 200 and the speakers 311 and 316 are connected to the digital television receiving device 100. The home theater system 1 is thus configured. The home theater system 1 enables the user 310 to enjoy stereophonic reproduction with a realistic sensation that the user 310 feels as if he/she were in a movie theater, a concert hall, or a sports stadium while staying at home.

The digital television receiving device 100 and the home theater device 200 are connected to each other via an HDMI cable 320 conforming to an HDMI (High-Definition Multimedia Interface) standard. The HDMI cable 320 includes a data line 321 for transmitting and receiving video/audio data (video data and audio data) and a CEC signal line 322 for transmitting and receiving a CEC (Consumer Electronic Control) command for performing control between devices.

The home theater device 200 decodes 5.1 channel audio data, and drives the speakers 311 and 316 with an amplifier, described below. The 5.1 channel audio data is included in a broadcast signal, and is compressed in an AC-3 (Audio Code number 3) system, for example. The home theater device 200 makes sound volume adjustment and sound volume control such as mute according to an operation of a remote control device 301 by the user 310 in cooperation with the digital television receiving device 100.

In the home theater system 1 according to the present embodiment, a portion, excluding the display 103 (see FIG. 2), in the digital television receiving device 100, is used as an audio/video reproduction device, the home theater device 200 is used as an audio output control device, and the display 103 (see FIG. 2) in the digital television receiving device 100 is used as a display.

(1-2) Configuration of Digital Television Receiving Device and Home Theater Device FIG. 2 is a block diagram illustrating a detailed configuration of the digital television receiving device 100 and the home theater device 200 in the home theater system 1 illustrated in FIG. 1.

The digital television receiving device 100 and the home theater device 200 are connected to each other via the HDMI cable 320. The digital television receiving device 100 can selectively be set to a television mode and a theater mode. The home theater device 200 can selectively be set to a theater mode or a mute status.

The theater mode is a mode in which audio based on audio data obtained by the digital television receiving device 100 is not output from a speaker contained in the digital television receiving device 100, described below, but output from speakers 311 to 316 connected to the home theater device 200. On the other hand, the television mode is a mode in which audio based on audio data obtained by the digital television receiving device 100 is output from a built-in speaker, described below.

A configuration of the digital television receiving device 100 will be first described. As illustrated in FIG. 2, the digital television receiving device 100 includes a tuner 101, a decoder 102, a display 103, an audio outputor 104, an HDMI transmitter/receiver 105, a CPU 106, a memory 107, and a remote control light receiver 108. The tuner 101 and the decoder 102 constitute a content supply source 110. A remote control device 301 is attached to the digital television receiving device 100.

The tuner 101 receives, tunes, and demodulates a digital broadcast signal in terrestrial digital broadcasting, digital satellite broadcasting, or the like, and outputs a video signal and an audio signal having a selected content. The demodulator 102 decodes a video signal and an audio signal output from the tuner 101, and outputs video data and audio data. The display 103 displays video on a screen based on the video data output from the decoder 102. The audio outputor 104 includes two speakers, and outputs audio from the speakers based on the audio data output from the decoder 102.

The remote control device 301 includes a sound volume operation button for a sound volume operation. The sound volume operation includes sound volume adjustment, mute setting, and mute release. The sound volume operation button includes a sound volume up button for increasing a sound volume, a sound volume down button for decreasing a sound volume, and a mute button for issuing instructions to perform mute setting and mute release. The user 310 can perform sound volume operations of the speakers in the audio outputor 104 and the speakers 311 to 316 using the sound volume operation button in the remote control device 301. In this case, the remote control device 301 transmits sound volume operation information corresponding to an operation of the sound volume operation button as a light signal. The remote control light receiver 108 converts, when it has received the sound volume operation information from the remote control device 301 as a light signal, the light signal into an electric signal, and feeds the electric signal to the CPU 106 as the sound volume operation information.

If the digital television receiving device 100 is set to a television mode, the CPU 106 controls a sound volume of the audio output from the speakers in the audio outputor 104 based on the sound volume operation information while on-screen displaying the controlled sound volume on the display 103. If the digital television receiving device 100 is set to the theater mode, the CPU 106 controls a sound volume of the audio output from the speakers 311 to 316 in the home theater system 1 through the home theater device 200 while on-screen displaying the controlled sound volume on the display 103.

The memory 107 stores status data relating to sound volume control (hereinafter referred to as sound volume control status data) in the home theater device 200 at the current time point. The sound volume control status data includes maximum sound volume value data, sound volume setting value data, and mute setting status data in the home theater device 200.

The maximum sound volume value data is data representing a maximum value in a sound volume adjustable range of the home theater device 200. The sound volume control status data may include minimum sound volume value data representing a minimum value in the sound volume adjustable range. If the sound volume control status data does not include minimum sound volume value data, the minimum sound volume value data is zero, for example.

The sound volume setting value data is data representing a value (level) of a sound volume set in the home theater device 200. The mute setting status data is data indicating whether the home theater device 200 is set to a mute status.

The display 103 includes a cathode ray tube, a liquid crystal display, a plasma display, or the like. The display 103 has a screen for displaying video of digital broadcasting. The display 103 displays the current sound volume of the speakers in the audio outputor 104 or the speakers 311 to 316 with the current sound volume superimposed on the video in the digital broadcasting based on the control of the CPU 106.

The HDMI transmitter/receiver 105 communicates with the HDMI transmitter/receiver 205 in the home theater device 200, described below, to transmit video/audio data and a CEC command to the home theater device 200 and receive a CEC command from the home theater device 200. In the HDMI standard, the video/audio data is transmitted in one direction from the HDMI transmitter/receiver 105 to the HDMI transmitter/receiver 205, and the CEC commands are bidirectionally transmitted between the HDMI transmitter/receiver 105 and the HDMI transmitter/receiver 205.

The digital television receiving device 100 can easily perform sound volume bar display by storing in the memory 107 both the maximum sound volume value data and the sound volume setting value data at the current time point in the home theater device 200. The sound volume bar display refers to display of a sound volume depending on the length of a bar. In the present embodiment, a bar representing a sound volume adjustable range (hereinafter referred to as an adjustable range bar) and a bar representing the current sound volume (hereinafter referred to as a sound volume bar) are displayed on a screen of the display 103, as described below.

A configuration of the home theater device 200 will be described below. As illustrated in FIG. 2, the home theater device 200 includes a sound volume operator 201, a memory 202, an amplifier 203, a CPU 204, and an HDMI transmitter/receiver 205.

The sound volume operator 201 is provided for the user 310 to directly perform the sound volume operation for the home theater device 200 when the digital television receiving device 100 is set to the theater mode. The sound volume operator 201 includes a sound volume up button for increasing a sound volume, a sound volume down button for decreasing a sound volume, and a mute button for issuing instructions to perform mute setting and mute release. Thus, during the theater mode, the user 310 can perform not only the sound volume operation using the remote control device 301 but also the sound volume operation using the sound volume operator 201 in the home theater device 200. The sound volume operator 201 may include a volume adjustment knob of a rotary dial type. In this case, sound volume adjustment with an analog feeling becomes more possible than that in an operation for pressing the sound volume operation button. Some or all of the sound volume up button, the sound volume down button, the mute button, and the volume adjustment knob in the sound volume operator 201 may be provided in a main body of the home theater device 200, or may be provided in a remote control device attached to the home theater device 200.

The memory 202 stores current sound volume control status data in the amplifier 203 based on the control of the CPU 204.

The HDMI transmitter/receiver 205 communicates with the HDMI transmitter/receiver 105 in the digital television receiving device 100, to receive the video/audio data and a CEC command from the digital television receiving device 100 and transmit the CEC command to the digital television receiving device 100.

The CPU 204 receives the CEC command and the video/audio data from the CPU 106 in the digital television receiving device 100 via the HDMI transmitter/receiver 205. The CPU 204 interrupts the CEC command, and controls an amplification factor (gain) of the amplifier 203 based on an interruption result. The CPU 204 controls the amplification factor of the amplifier 203 based on an instruction from the sound volume operator 201.

The amplifier 203 converts the audio data into an analog audio signal, amplifies the analog audio signal at a controlled amplification factor, and drives the speakers 311 to 316 based on the amplified analog audio signal. Thus, audio the sound volume of which has been controlled is output from the speakers 311 to 316.

(1-3) Schematic Operation of Digital Television Receiving Device and Home Theater Device The outline of operations of the digital television receiving device 100 and the home theater device 200 during the sound volume operation will be described. The digital television receiving device 100 is set to the theater mode.

First, during the sound volume operation (sound volume adjustment, mute setting, or mute release), when the user 310 presses the sound volume operation button in the remote control device 301, the CPU 106 in the digital television receiving device 100 acquires sound volume operation information corresponding to an operation of the sound volume operation button via the remote control light receiver 108. The CPU 106 then transmits the CEC command corresponding to the sound volume operation information to the CPU 204 in the home theater device 200 via the HDMI transmitter/receiver 105, the HDMI cable 320, and the HDMI transmitter/receiver 205. The CEC command includes sound volume setting value data.

The CPU 204 interprets the received CEC command, to extract the sound volume setting value data from the CEC command and set the extracted sound volume setting value data in the amplifier 203. The CPU 204 causes the memory 202 to store the extracted sound volume setting value data. Thus, the amplification factor of the amplifier 203 is controlled based on the sound volume setting value data. As a result, the sound volume of the audio output from the speakers 311 to 316 is controlled.

An operation for the digital television receiving device 100 to acquire the sound volume control status data from the home theater system 200 will be described below. The CPU 106 in the digital television receiving device 100 transmits the CEC command for requesting the sound volume control status data to the CPU 204 in the home theater device 200 via the HDMI transmitter/receiver 105, the HDMI cable 320, and the HDMI transmitter/receiver 205.

The CPU 204 interprets the received CEC command, to acquire the current sound volume setting value data set in the amplifier 203. Further, the CPU 204 causes the memory 202 to store the acquired sound volume setting value data while transmitting the CEC command including the sound volume control status data to the CPU 106 in the digital television receiving device 100 via the HDMI transmitter/receiver 205, the HDMI cable 320, and the HDMI transmitter/receiver 105. The sound volume control status data includes the maximum sound volume value data, the sound volume setting value data, and the mute setting status data.

The CPU 106 interprets the received CEC command, to extract the sound volume control status data from the CEC command, and cause the memory 107 to store the extracted sound volume control status data. The CPU 106 on-screen displays the adjustable range bar and the sound volume bar on the screen of the display 103 based on the maximum sound volume value data and the sound volume setting value data included in the extracted sound volume control status data.

The sound volume of the audio output from the speakers 311 to 316 will be referred to as a sound volume of the amplifier 203 and a sound volume of the home theater device 200.

(1-4) Example of Sound Volume Bar Display

Figure 3A:
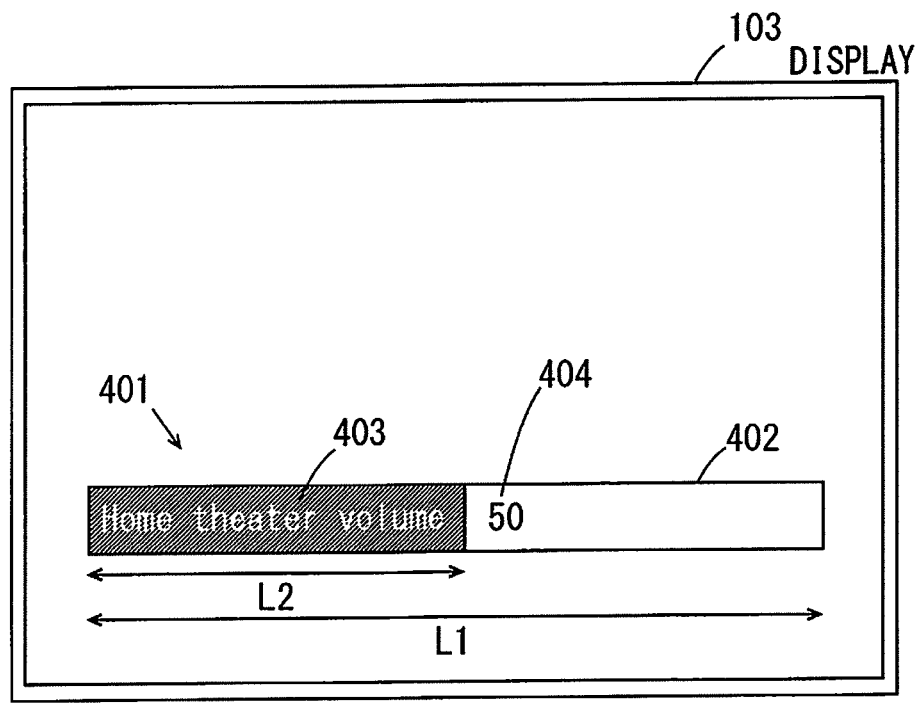
FIG. 3A illustrates an example of sound volume bar display in the home theater system according to the first embodiment.
Figure 3B:
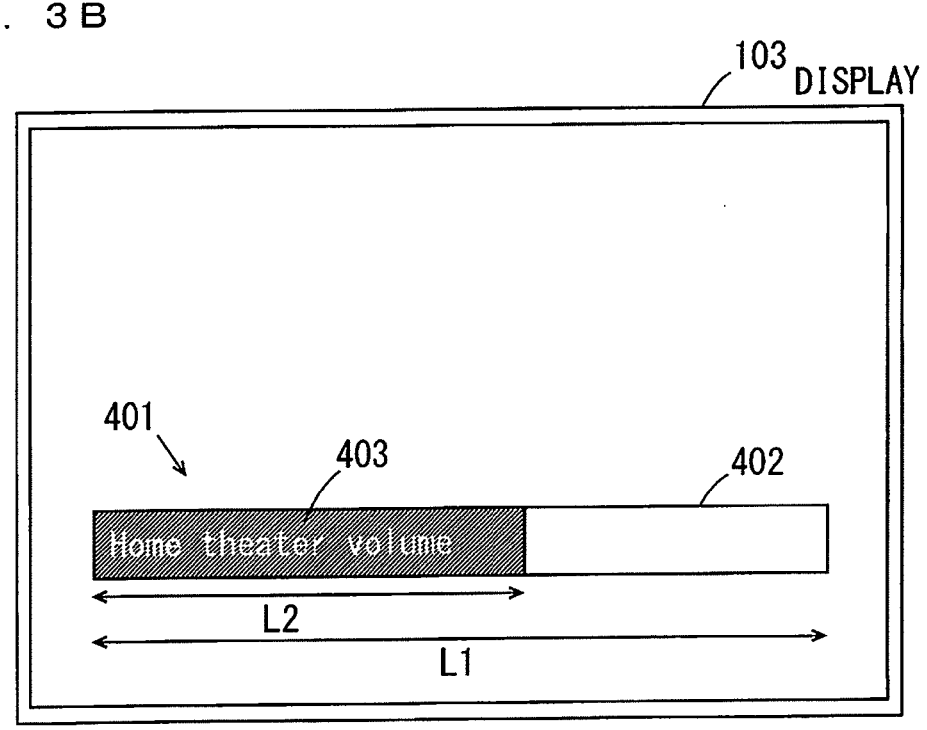
FIG. 3B illustrates an example of sound volume bar display in the home theater system according to the first embodiment.

FIGS. 3A and 3B illustrate an example of sound volume bar display in the home theater system 1 according to the first embodiment. In an example illustrated in FIG. 3A, a sound volume bar display 401 on the screen of the display 103 includes an adjustable range bar 402 representing the sound volume adjustable range of the home theater device 200, a sound volume bar 403 representing the current sound volume of the home theater device 200, and a number 404 representing a ratio of the current sound volume of the home theater device 200. In an example illustrated in FIG. 3B, the sound volume bar display 401 on the screen of the display 103 includes an adjustable range bar 402 representing the sound volume adjustable range of the home theater device 200 and a sound volume bar 403 representing the current sound volume of the home theater device 200.

The length L1 of the whole adjustable range bar 402 corresponds to the maximum value in the sound volume adjustable range of the home theater device 200. The length L2 of the sound volume bar 403 corresponds to the current sound volume of the home theater device 200. Therefore, a ratio of the length L2 of the sound volume bar 403 to the length L1 of the adjustable range bar 402 represents a ratio of the current sound volume to the sound volume adjustable range. The number 404 illustrated in FIG. 3A represents the ratio of the current sound volume to the sound volume adjustable range.

When the digital television receiving device 100 and the home theater device 200 are set to the theater mode, as described below, the digital television receiving device 100 acquires the sound volume control status data from the home theater device 200. The sound volume bar display 401 illustrated in FIGS. 3A and 3B can be performed based on the maximum sound volume value data and the sound volume setting value data included in the sound volume control status data.

It is assumed that the maximum sound volume value data is 100, and the minimum sound volume value data is zero, for example. In this case, if the sound volume setting value data at the current time point is 50, the sound volume bar 403 having a length L2 corresponding to 50 percent of the length L1 of the adjustable range bar 402 (the maximum length of the sound volume bar 403) is displayed. 50 percent of the current sound volume is displayed by the number 404.

Alternatively, the sound volume bar 403 may be displayed by dB (decibel) conversion of the maximum audio value data and the sound volume setting value data. It is assumed that the maximum audio value data is 100, and the minimum sound volume value data is one, for example. In this case, the sound volume adjustable range is 0 dB to +40 dB. If the sound volume setting value data at the current time point is 40, 20 log 40=+32 [dB]. Therefore, the current sound volume is +32 dB. In this case, the ratio of the current sound volume to the sound volume adjustable range is 32/40=80 [%]. Therefore, the sound volume bar 403 having a length L2 corresponding to 80 percent of the length L1 of the adjustable range bar 402 is displayed. 80 percent of the current sound volume is displayed by the number 404.

In the examples illustrated in FIGS. 3A and 3B, the user 310 can intuitively and visually recognize the current sound volume of the home theater device 200 based on the ratio of the length L2 of the sound volume bar 403 to the length L1 of the adjustable range bar 402. In the example illustrated in FIG. 3A, the user 310 can recognize the accurate ratio of the sound volume of the home theater device 200 based on the number 404.

(1-5) Detailed Operation of Home Theater System

A sound volume control operation of the home theater system 1 according to the present embodiment will be described below. The sound volume control operation, described below, is performed when the CPU 106 in the digital television receiving device 100 executes a program stored in the memory 107 while the CPU 204 in the home theater device 200 executes a program stored in the memory 202.

Thus, control operation subjects of the digital television receiving device 100 and the home theater device 200 are respectively the CPU 106 and the CPU 204. In order to simplify the illustration, the digital television receiving device 100 and the home theater device 200 will be described below as operation subjects. A CEC command is abbreviated as a command, as needed.

A mute setting status refers to a state where an analog audio signal is not output to the speakers 311 to 316 from the amplifier 203. In this case, audio is not output from the speakers 311 to 316. A mute release status refers to a state where an analog audio signal is output to the speakers 311 to 316 from the amplifier 203. In this case, audio is output from the speakers 311 to 316.

In a sequence diagram, described below, mute setting and mute release are respectively written as "mute ON" and "mute OFF". The mute setting status and the mute release status are respectively written as "mute=ON status" and "mute=OFF status".

Minimum sound volume value data is zero. Mute setting status data represents a mute setting status (mute ON) and a mute release status (mute OFF).

(a) Setting Operation to Theater Mode

FIG. 4 is a sequence diagram illustrating transmission and receiving of CEC commands between the digital television receiving device 100 and the home theater device 200 during a theater mode setting operation. FIG. 4 illustrates a control operation performed when the remote control device 301 performs the theater mode setting operation.

In FIG. 4, when the remote control device 301 issues an instruction to set the theater mode, the digital television receiving device 100 first transmits a <Request to switch to Theater mode> command to the home theater device 200 (step S201). This command is a command for requesting switching to the theater mode. The home theater device 200 releases a mute status of the amplifier 203 while setting the amplifier 203 to the theater mode in response to the command received in step S201. Then, the home theater device 200 transmits a <Reply completion of Theater mode> command to the digital television receiving device 100 (step S202). This command is a command indicating that the setting of the theater mode is completed. Since then, the home theater device 200 enters a state where audio data transmitted from the digital television receiving device 100 can be reproduced.

The digital television receiving device 100 continues to transmit an <Acquire volume status> command to the home theater device 200 (step S203). This command is a command for requesting the sound volume control status data. The home theater device 200 transmits a <Notify with> [Max Value] ["Mute Off", X (current volume)] command to the digital television receiving device 100 in response to the command received in step S203 (step S204). This command is a command for notifying maximum sound volume value data, a mute release status, and current sound volume setting value data "X" as the sound volume control status data. The digital television receiving device 100 stores the sound volume control status data received in step S204 in the memory 107.

Thus, the home theater device 200 is set to the theater mode while the current sound volume control status data is transmitted from the home theater device 200 to the digital television receiving device 100. Thus, the sound volume control status data stored in the memory 107 in the digital television receiving device 100 is updated with the newest sound volume control status data.

(b) Sound Volume Adjusting Operation by Single Pressing

In the following description, pressing the sound volume operation button once means an operation for the user 310 to press the sound volume operation button once (one push operation) for a shorter time than a predetermined time (e.g., 300 ms). A sound volume value (a sound volume level) of the home theater device 200 is changed by "1" by pressing the sound volume operation button once.

Figure 5:
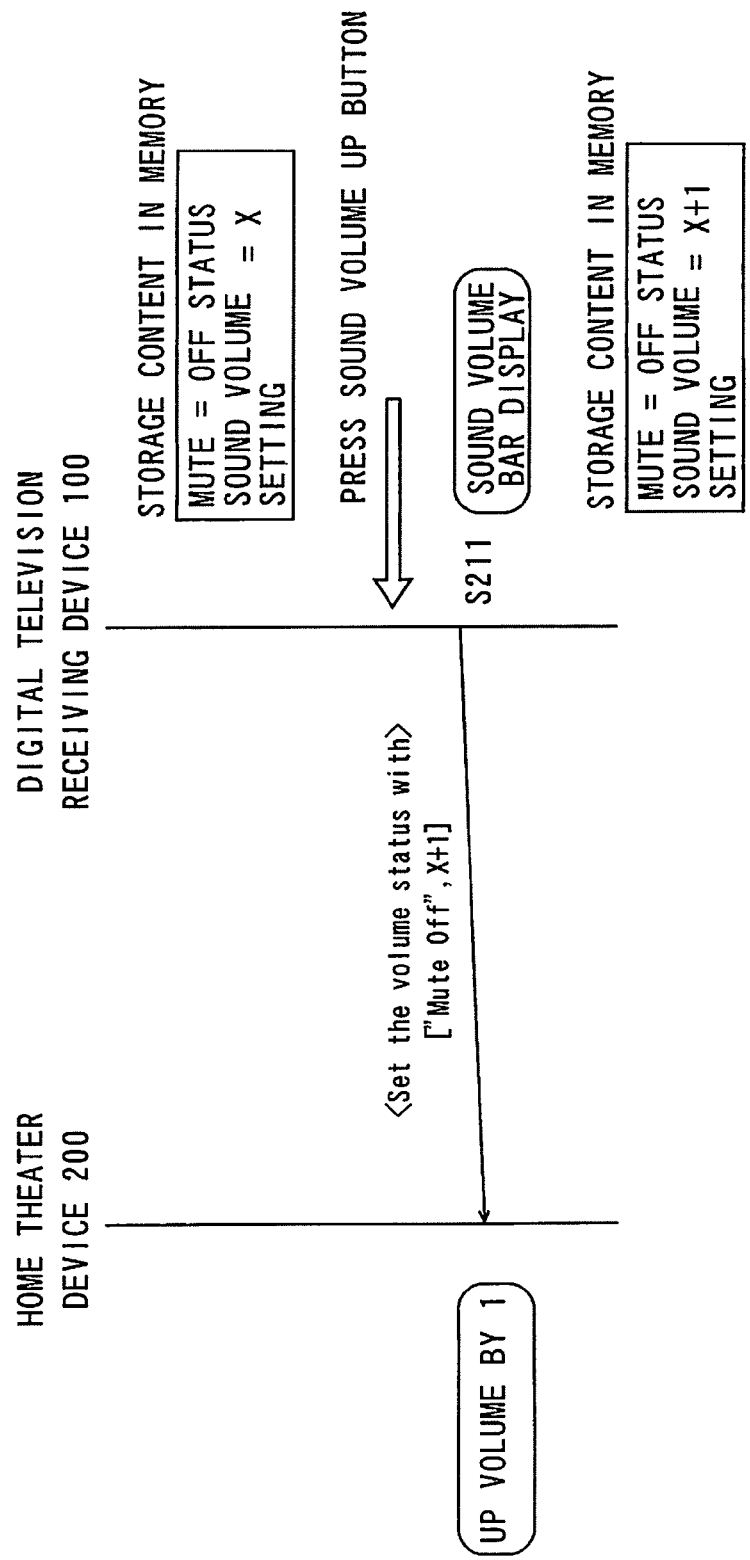
FIG. 5 is a sequence diagram illustrating transmission and receiving of a CEC command between the digital television receiving device and the home theater device during a sound volume adjusting operation by pressing a sound volume operation button once.

FIG. 5 is a sequence diagram illustrating transmission and receiving of a CEC command between the digital television receiving device 100 and the home theater device 200 during a sound volume adjusting operation by pressing the sound volume operation button once. FIG. 5 illustrates an operation for controlling sound volume adjustment made when a sound volume increasing operation is performed by pressing the sound volume up button once. In FIG. 5, the sound volume value being increased by "1" is displayed as "up volume by 1".

The digital television receiving device 100 determines sound volume setting value data to be transmitted to the home theater device 200 from audio operation information indicating that the sound volume up button in the remote control device 301 has been pressed and the sound volume setting value data in the sound volume control status data stored in the memory 107. At this time, the sound volume control status data stored in the memory 107 indicates that the current sound volume setting value data in the home theater device 200 is "X".

The digital television receiving device 100 transmits a <Set the volume status with> ["Mute Off", X+1] command to the home theater device 200 based on the sound volume setting value data stored in the memory 107 (step S211). This command is a command for releasing a mute status of the amplifier 203 while setting sound volume setting value data "X+1" in the amplifier 203. The home theater device 200 releases the mute status of the amplifier 203 while setting the sound volume setting value data "X+1" based on the command received in step S211.

Then, the digital television receiving device 100 updates the sound volume setting value data stored in the memory 107 to the newest sound volume setting value data "X+1" while on-screen displaying a sound volume bar based on the sound volume setting value data "X+1" on the screen of the display 103.

If a sound volume decreasing operation is performed by pressing the sound volume down button once, a <Set the volume status with> ["Mute Off, X−1] command is transmitted instead of the <Set the volume status with> ["Mute Off", X+1] command in step S211 from the digital television receiving device 100 to the home theater device 200. This command is a command for releasing the mute status of the amplifier 203 while setting sound volume setting value data "X−1" in the amplifier 203. Another operation during the sound volume decreasing operation is similar to the operation during the sound volume increasing operation.

Thus, the sound volume value of the home theater device 200 is changed by "1" by transmitting the CEC command in one step from the digital television receiving device 100 to the home theater device 200. Thus, the responsibility of the sound volume adjustment can be improved.

(c) Sound Volume Adjusting Operation by Long Pressing

In the following description, pressing the sound volume operation button long means an operation for the user 310 to continuously press the sound volume operation button (a continuous sound volume adjusting operation) for a longer time than a predetermined time (e.g., 300 ms). The sound volume value (the sound volume level) of the home theater device 200 is changed by "2" or more by pressing the sound volume operation button long.

Figure 6:
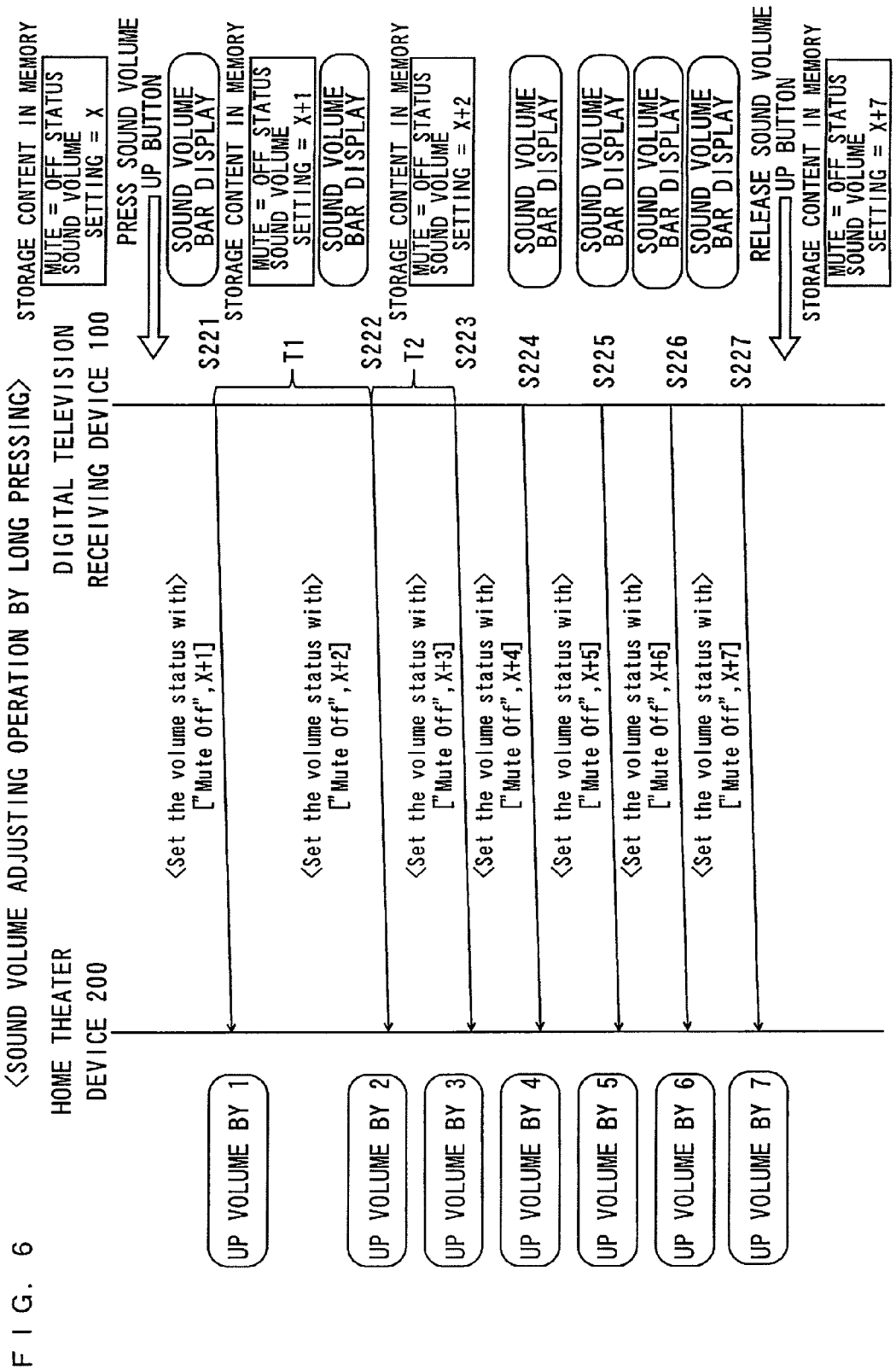
FIG. 6 is a sequence diagram illustrating transmission and receiving of CEC commands between the digital television receiving device and the home theater device during a sound volume adjusting operation by pressing the sound volume operation button long.
Figure 7:
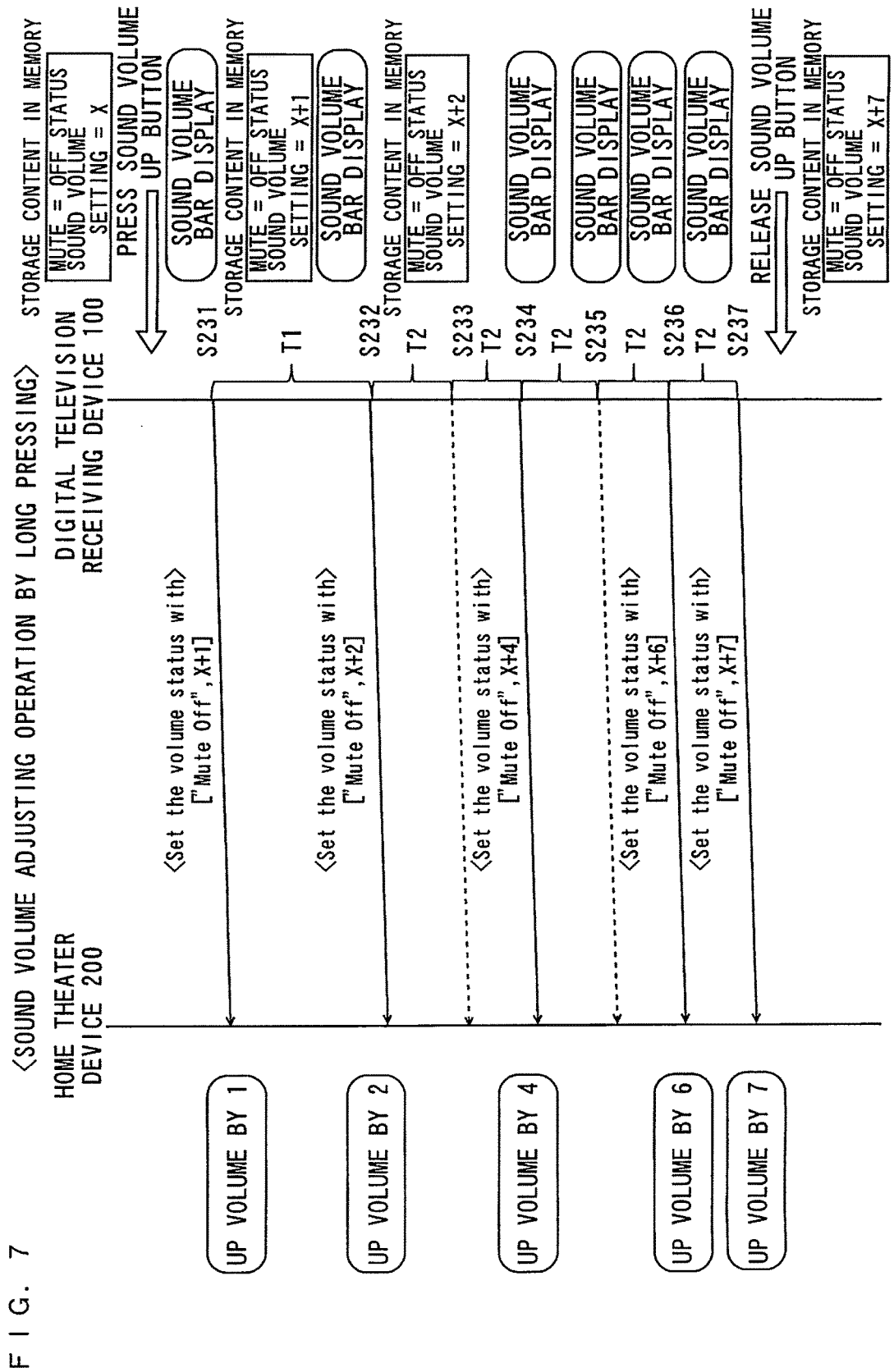
FIG. 7 is a sequence diagram illustrating transmission and receiving of CEC commands between the digital television receiving device and the home theater device during a sound volume adjusting operation by pressing the sound volume operation button long.

FIGS. 6 and 7 are sequence diagrams illustrating transmission and receiving of CEC commands between the digital television receiving device 100 and the home theater device 200 during a sound volume adjusting operation by pressing the sound volume operation button long. FIGS. 6 and 7 illustrate an operation for controlling sound volume adjustment made when a sound volume increasing operation is performed by pressing the sound volume up button long. FIG. 6 illustrates an example in which the sound volume setting value data is continuously increased by one. FIG. 7 illustrates an example in which the sound volume setting value data is increased by a predetermined value larger than one. In FIGS. 6 and 7, the sound volume value (the sound volume level) of the home theater device 200 being increased by "1" to "5" are respectively displayed as "up sound volume by 1" and "up sound volume by 5".

First, in the example illustrated in FIG. 6, the sound volume control status data stored in the memory 107 indicates that the current sound volume setting value data of the home theater device 200 is "X".

When the user 310 presses the sound volume up button in the remote control device 301, the digital television receiving device 100 transmits a <Set the volume status with> ["Mute Off", X+1] command to the home theater device 200 based on the sound volume setting value data stored in the memory 107 (step S221). This command is a command for releasing the mute status of the amplifier 203 while setting sound volume setting value data "X+1" in the amplifier 203. The home theater device 200 releases the mute status of the amplifier 203 while setting the sound volume setting value data "X+1" in the amplifier 203 based on the command received in step S221.

The digital television receiving device 100 transmits a command <Set the volume status with> ["Mute Off", X+2] command to the home theater device 200 after a predetermined standby time T1 (e.g., 300 ms) (step S222). This command is a command for maintaining a mute release status of the amplifier 203 while setting sound volume setting value data "X+2" in the amplifier 203. The home theater device 200 sets the sound volume setting value data "X+2" in the amplifier 203 based on the command received in step S222.

The digital television receiving device 100 determines that the sound volume up button is pressed long through a lapse of a standby time T1. Thus, the digital television receiving device 100 sends a command for maintaining the mute release status of the amplifier 203 while setting sound volume setting value data that increases by one in the amplifier 203 for each lapse of a short period T2 (e.g., 150 ms) (steps S223 to S227). More specifically, the digital television receiving device 100 sequentially transmits commands respectively including sound volume setting value data "X+3", "X+4", "X+5", "X+6" and "X+7" to the home theater device 200 in steps S223 to S227. The home theater device 200 sequentially sets the sound volume setting value data "X+3", "X+4", "X+5", "X+6" and "X+7" in the amplifier 203 based on the commands received in steps S223 to S227.

During this time, the digital television receiving device 100 updates the sound volume setting value data stored in the memory 107 with the newest sound volume setting value data "X+1" to "X+7" while on-screen displaying a sound volume bar based on the sound volume setting value data "X+1" to "X+7" on the screen of the display 103.

In the example illustrated in FIG. 6, after the digital television receiving device 100 transmits a <Set the volume status with> ["Mute Off", X+7] command to the home theater device 200 (after step S227), the sound volume up button is released. Thus, the digital television receiving device 100 finishes transmitting the CEC commands.

Thus, the remote control device 301 in the digital television receiving device 100 can finely adjust the sound volume level of the home theater device 200 by one.

If the sound volume decreasing operation is performed by pressing the sound volume down button long, CEC commands respectively including sound volume setting value data "X−1", "X−2", "X−3", "X−4", "X−5", "X−6" and "X−7" are transmitted instead of the CEC commands respectively including the sound volume setting value data "X+1", "X+2", "X+3", "X+4", "X+5", "X+6" and "X+7" from the digital television receiving device 100 to the home theater device 200. Another operation during the sound volume decreasing operation is similar to the operation during the sound volume increasing operation.

An example illustrated in FIG. 7 will be described below. Processes in steps S231, S232, S234, S236 and S237 illustrated in FIG. 7 are similar to the processes in steps S221, S222, S224, S226 and S227 illustrated in FIG. 6.

The processes in steps S233 and S235 illustrated in FIG. 7 differ from the processes in steps S223 and S225 illustrated in FIG. 6. More specifically, in the example illustrated in FIG. 6, the digital television receiving device 100 transmits the <Set the volume status with> ["Mute Off", X+2] command to the home theater device 200 in step S223, and transmits a <Set the volume status with> ["Mute Off", X+5] command thereto in step S225. On the other hand, in the example illustrated in FIG. 7, the digital television receiving device 100 stops transmitting the CEC commands to the home theater device 200, respectively, in steps S233 and S235.

If the sound volume decreasing operation is performed by pressing the sound volume down button long, CEC commands respectively including sound volume setting value data "X−1", "X−2", "X−4", "X−6" and "X−7" are transmitted instead of the CEC commands respectively including the sound volume setting value data "X+1", "X+2", "X+4", "X+6" and "X+7" from the digital television receiving device 100 to the home theater device 200. Another operation during the sound volume decreasing operation is similar to the operation during the sound volume increasing operation.

Thus, the sound volume setting value data are thinned so that the number of times of transmission and receiving of the CEC commands is reduced. Thus, a CEC command transmission interval is shortened so that the sound volume of the home theater device 200 can be quickly adjusted.

(d) Mute Setting Operation and Mute Releasing Operation

Figure 8:
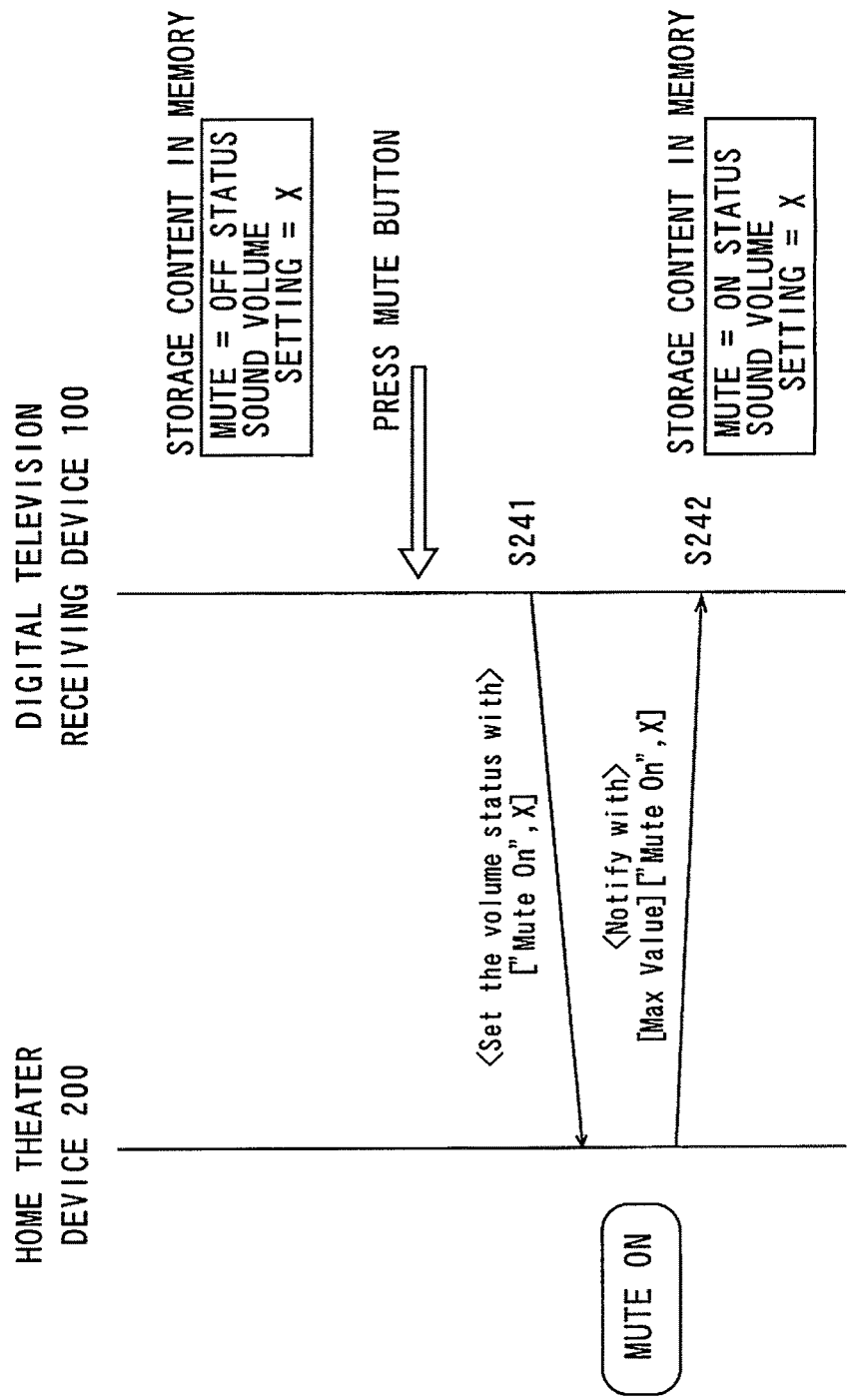
FIG. 8 is a sequence diagram illustrating transmission and receiving of CEC commands between the digital television receiving device and the home theater device during a mute setting operation.

FIG. 8 is a sequence diagram illustrating transmission and receiving of CEC commands between the digital television receiving device 100 and the home theater device 200 during a mute setting operation. FIG. 8 illustrates an operation for controlling mute setting performed when the mute setting operation is performed by the mute button.

When the user 310 performs the mute setting operation by pressing the mute button in the remote control device 301, the digital television receiving device 100 transmits a <Set the volume status with> ["Mute On", X] command to the home theater device 200 (step S241). This command is a command for setting the amplifier 203 to a mute status while setting sound volume setting value data "X" in the amplifier 203.

The home theater device 200 is responsive to the command received in step S241, to set the amplifier 203 to the mute status while setting the sound volume setting value data "X" in the amplifier 203. The home theater device 200 transmits a <Notify with> [Max Value] ["Mute On", X] command to the digital television receiving device 100 (step S242). This command is a command for notifying maximum sound volume value data, a mute setting status, and the sound volume setting value data "X" as the sound volume control status data. The digital television receiving device 100 updates the sound volume control status data stored in the memory 107 with the sound volume control status data received in step S242.

If the mute releasing operation is performed, a <Set the volume status with> ["Mute Off", X] command is transmitted instead of the <Set the volume status with> ["Mute On", X] command from the digital television receiving device 100 to the home theater device 200 in step S241. A <Notify with> [Max Value] ["Mute Off", X] command is transmitted instead of the <Notify with> [Max Value] ["Mute On", X] command from the home theater device 200 to the digital television receiving device 100 in step S242.

Thus, even when the sound volume operator 201 performs a sound volume adjusting operation in the home theater device 200, the digital television receiving device 100 can acquire the newest sound volume control status data in the home theater device 200 during the mute setting operation or the mute releasing operation.

High-speed responsibility is not requested for the mute setting operation and the mute releasing operation. Therefore, the sound volume control status data is transmitted from the home theater device 200 to the digital television receiving device 100 during the mute setting operation and the mute releasing operation so that the sound volume control status data stored in the memory 107 can be updated to the newest sound volume control status data without deteriorating the responsibility of the sound volume adjusting operation.

(1-6) Effects of First Embodiment

Thus, in the home theater system 1 according to the present embodiment, when the digital television receiving device 100 and the home theater device 200 are set to the theater mode, the CPU 106 in the digital television receiving device 100 acquires the current sound volume control status data in the home theater device 200, and updates the sound volume setting value data stored in the memory 107 with the acquired sound volume setting value data. Thus, the CPU 106 can recognize the current sound volume of the home theater device 200 from the sound volume setting value data stored in the memory 107 during an audio operation. Thus, the CPU 106 can determine the sound volume setting value data after the operation without acquiring the current sound volume from the home theater device 200. Therefore, the number of times of transmission and receiving of the CEC commands between the digital television receiving device 100 and the home theater device 200 can be reduced during the sound volume operation. As a result, the responsibility of the sound volume operation can be increased.

If the sound volume of the home theater device 200 is changed using the sound volume operation by the remote control device 301, the newest sound volume setting value data is stored in the memory 107. Therefore, the continuity of the sound volume operation can be maintained.

The CPU 106 can recognize the maximum value in the sound volume adjustable range of the home theater device 200 from the maximum audio value data stored in the memory 107. Thus, the ratio of the current sound volume of the home theater device 200 to the maximum value of the sound volume adjustable range of the home theater device 200 can be displayed on the screen of the display 103.

Particularly, the user 310 can intuitively and visually grasp the current sound volume based on the ratio of the length of the sound volume bar 403 to the length of the adjustable range bar 402 in the sound volume bar display 401 regardless of the type of the home theater device 200.

In this case, the CPU 106 can display the ratio of the current sound volume without transmitting and receiving of CEO commands to and from the home theater device 200. Thus, the speed of the sound volume display is increased. Therefore, the change in the sound volume of the home theater device 200 is instantly reflected on the change in the sound volume display on the display 103.

From the foregoing results, the operability and the responsibility of the sound volume operation are improved while high-precision sound volume adjustment can be made.

Thus, the control operation in the present embodiment can be easily implemented by using the above-mentioned CEO commands.

(2) Second Embodiment

A configuration of a home theater system 1 according to a second embodiment is similar to the configuration of the home theater system 1 illustrated in FIG. 1. Configurations of a digital television receiving device 100 and a home theater device 200 according to the second embodiment are similar to those illustrated in FIG. 2. The second embodiment differs from the first embodiment in control operations, described below, of a CPU 106 in the digital television receiving device 100 and a CPU 204 in the home theater device 200.

(2-1) Detailed Operation of Home Theater System 1

Figure 9:
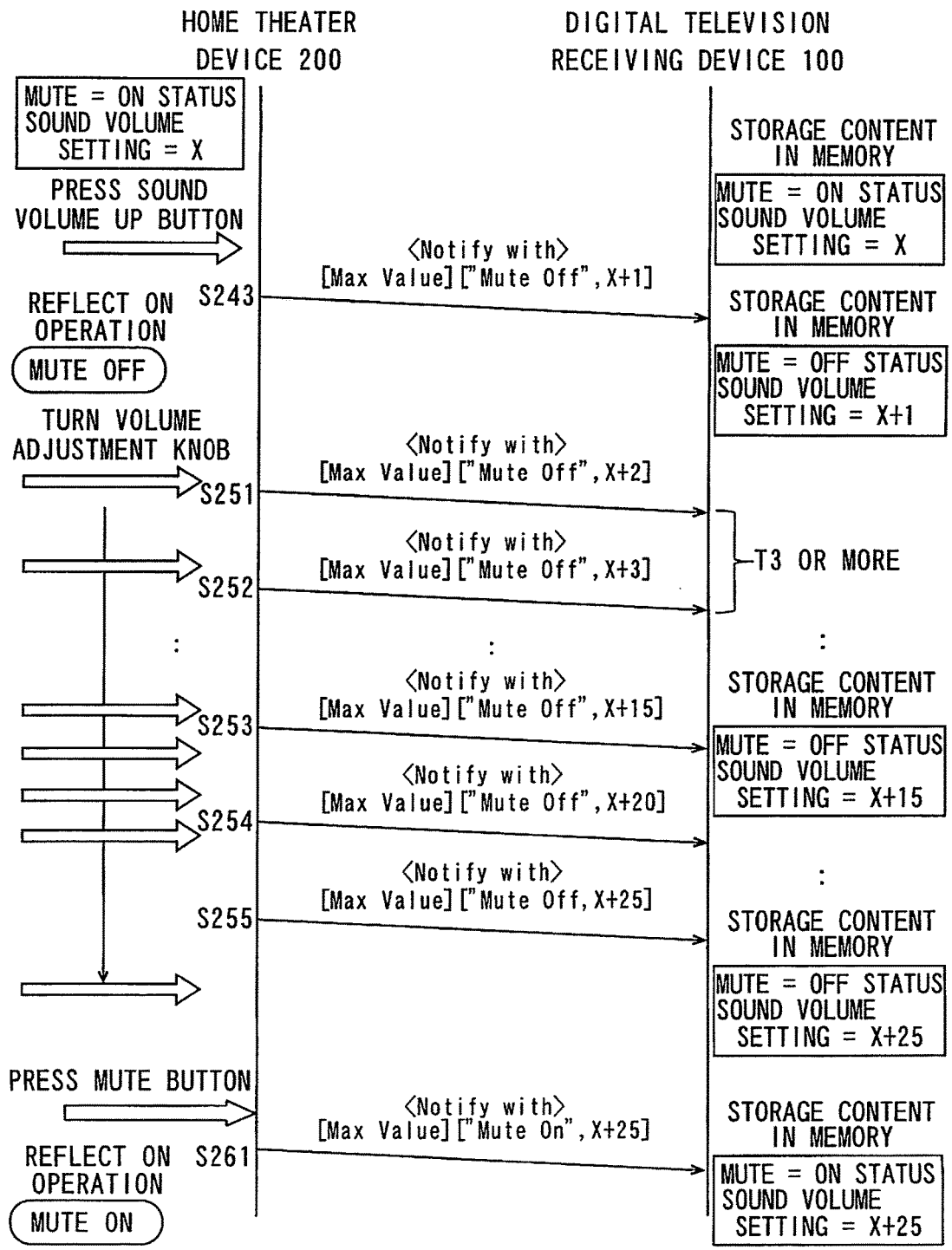
FIG. 9 is a sequence diagram illustrating transmission and receiving of CEC commands between a digital television receiving device and a home theater device by a sound volume adjusting operation in a home theater device according to a second embodiment of the present invention.

FIG. 9 is a sequence diagram illustrating transmission and receiving of CEC commands between the digital television receiving device 100 and the home theater device 200 by a sound volume adjusting operation in the home theater device 200. FIG. 9 illustrates control operations performed when a user 310 presses a sound volume up button in a sound volume operator 201 of the home theater device 200 once, presses a volume adjustment knob, and presses a mute button in a time-series manner.

In an example illustrated in FIG. 9, current sound volume setting value data in the home theater device 200 is "X".

First, when the user 310 presses the sound volume up button in the sound volume operator 201 once, the home theater device 200 releases a mute status of an amplifier 203 while setting sound volume setting value data "X+1" in the amplifier 203. The home theater device 200 transmits a <Notify with> [Max Value] ["Mute Off", X+1] command to the digital television receiving device 100 (step S243). This command is a command for notifying maximum sound volume value data, a mute release status, and the sound volume setting value data "X+1" in the home theater device 200 as sound volume control status data.

The digital television receiving device 100 updates sound volume control status data stored in a memory 107 with the sound volume control status data received in step S243. Since then, the digital television receiving device 100 uses the updated sound volume control status data in the memory 107 when a remote control device 301 performs a sound volume adjusting operation. Thus, continuity of the sound volume control status data is kept depending on whether the sound volume operator 201 in the home theater device 200 makes sound volume adjustment and the remote control device 301 in the digital television receiving device 100 makes sound volume adjustment.

A case where the user 310 turns the volume adjustment knob in the sound volume operator 201 will be described below. The user 310 can make sound volume adjustment with an analog operating feeling by turning the volume adjustment knob. The user 310 can make high-speed sound volume adjustment by rotating the volume adjustment knob fast. The home theater device 200 increases the sound volume setting value data by "1" every time the volume adjustment knob rotates through a predetermined angle in a clockwise direction. The home theater device 200 decreases the sound volume setting value data by "1" every time the volume adjustment knob rotates through a predetermined angle in a counterclockwise direction.

When the user 310 starts to turn the volume adjustment knob, the home theater device 200 sets sound volume setting value data "X+2" in the amplifier 203. The home theater device 200 transmits a <Notify with> [Max Value] ["Mute Off", X+2] command to the digital television receiving device 100 (step S251). This command is a command for notifying maximum sound volume data, a mute release status, and the sound volume setting value data "X+2" as the sound volume control status data. The digital television receiving device 100 updates the sound volume control status data stored in the memory 107 with the sound volume control status data received in step S251.

If the rotational speed of the volume adjustment knob is low, and it takes a predetermined time T3 (e.g., 100 ms) for the sound volume setting value data to increase by "1", the home theater device 200 transmits a command for notifying the sound volume control status data to the digital television receiving device 100 every time the sound volume setting value data increases by "1". For example, the home theater device 200 transmits a <Notify with> [Max Value] ["Mute Off", X+3] command to the digital television receiving device 100 (step S252). This command is a command for notifying maximum sound volume data, a mute release status, and sound volume setting value data "X+3" as the sound volume control status data. The digital television receiving device 100 updates the sound volume control status data stored in the memory 107 with the sound volume control status data received in step S252.

In the example illustrated in FIG. 9, the home theater device 200 transmits the commands including sound volume setting value data that increase by "1" to the digital television receiving device 100 until the sound volume setting value data increase to "X+15". The digital television receiving device 100 sequentially updates the sound volume setting value data stored in the memory 107 with the received sound volume setting value data.

In FIG. 9, illustration about transmission of the commands until the sound volume setting value data increases from "X+4" to "X+14" is omitted. The home theater device 200 transmits a <Notify with> [Max Value] ["Mute Off", X+15] command to the digital television receiving device 100 (step S253). This command is a command for notifying maximum sound volume value data, a mute release status, and sound volume setting value data "X+15" as the sound volume control status data. The digital television receiving device 100 updates the sound volume control status data stored in the memory 107 with the sound volume control status data received in step S253.

The CEC commands are then illustrated when the user 310 increases the rotational speed of the volume adjustment knob. If a period of time during which the sound volume setting value data increases is shorter than a time interval (a predetermined time T3) in which the CEC commands can be transmitted, the home theater device 200 sets an amount of increase in the sound volume setting value data to a value larger than "1".

In the example illustrated in FIG. 9, the home theater device 200 transmits a command including sound volume setting value data, which increases by "5", to the digital television receiving device 100. The home theater device 200 transmits a <Notify with> [Max Value] ["Mute Off", X+20] command to the digital television receiving device 100 (step S254). This command is a command for notifying maximum sound volume value data, a mute release status, and sound volume setting value data "X+20" as the sound volume control status data. If the user 310 further turns the volume adjustment knob at a faster rotational speed, the home theater device 200 transmits a <Notify with> [Max Value] ["Mute Off", X+25] command to the digital television receiving device 100 (step S255). This command is a command for notifying maximum sound volume value data, a mute release status, and sound volume setting value data "X+25" as the sound volume control status data.

The digital television receiving device 100 sequentially updates the sound volume control status data stored in the memory 107 with the sound volume control status data received in steps S254 and S255.

When the user 310 presses the mute button in the sound volume operator 201, the home theater device 200 then sets the amplifier 203 to a mute status. The home theater device 200 transmits a <Notify with> [Max Value] ["Mute On", X+25] command to the digital television receiving device 100 (step S261). This command is a command for notifying maximum sound volume value data, a mute setting status, and the current sound volume setting value data "X+25" as the sound volume control status data. The digital television receiving device 100 updates the sound volume control status data stored in the memory 107 with the sound volume control status data received in step S261.

A theater mode setting operation, a sound volume adjusting operation by single pressing, a sound volume adjusting operation by long pressing, a mute setting operation, and a mute releasing operation in the home theater system 1 according to the second embodiment are similar to those in the first embodiment.

(2-2) Effects of Second Embodiment

In the home theater system 1 according to the second embodiment, when the sound volume operation of the home theater device 200 is performed on the side of the home theater device 200, the sound volume setting value data after the sound volume operation is transmitted from the home theater device 200 to the digital television receiving device 100. Thus, the newest sound volume setting value data is stored in the memory 107 every time the sound volume operator 201 in the home theater device 200 performs the sound volume operation. As a result, even when the sound volume operation is performed on the side of the digital television receiving device 100 after the sound volume operation is performed on the side of the home theater device 200, the continuity of the sound volume operation can be maintained.

In this case, the CEC command is also transmitted in one step every time a status of the sound volume operation button changes. If the rotational speed of the volume adjustment knob is high, the sound volume setting value data are thinned so that the number of times of transmission of the CEC command is reduced. Thus, the quickness of the sound volume display of the digital television receiving device 100 is not deteriorated.

(3) Operation of Reference Example

As to an operation of a reference example described below, the current sound volume setting value data in the home theater device 200 is not stored in the memory 107 in the digital television receiving device 100. Thus, the digital television receiving device 100 is required to acquire the current sound volume setting value data in the home theater device 200 from the home theater device 200 every time the sound volume operation is performed.

In the reference example, the sound volume control status data is replaced with sound volume status data including no maximum sound volume value data. The sound volume status data includes sound volume setting value data and mute setting status data. Thus, the digital television receiving device 100 displays a value of the current sound volume of the home theater device 200 by a number on the display 103. The same sound volume may be represented by different values depending on the type of the home theater device 200. Therefore, it is difficult for the user 310 to intuitively grasp the sound volume of the home theater device 200.

(a) Sound Volume Adjusting Operation by Single Pressing

Figure 10:
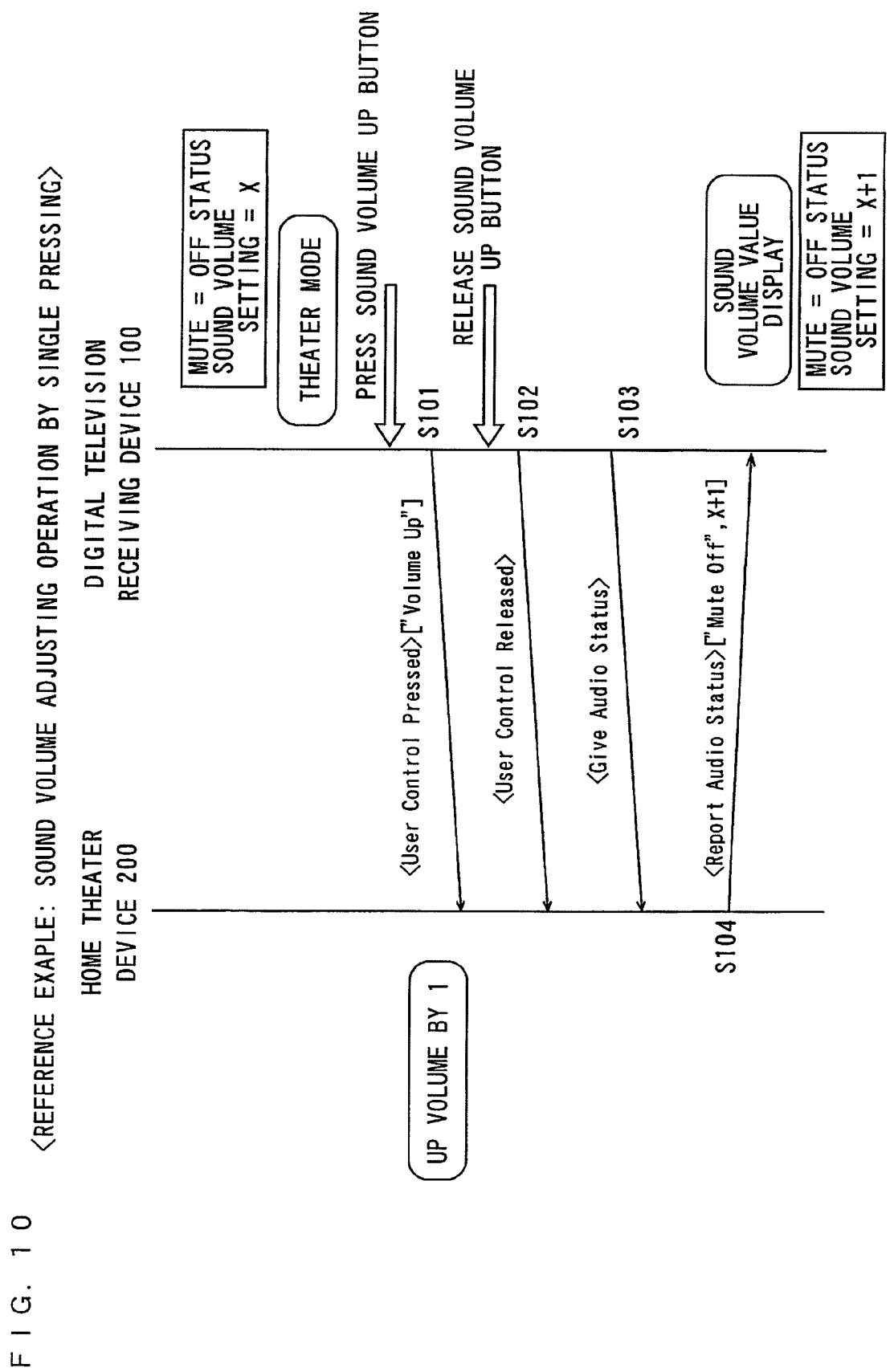
FIG. 10 is a sequence diagram illustrating a reference example of transmission and receiving of CEC commands between the digital television receiving device and the home theater device during a sound volume adjusting operation by pressing the sound volume operation button once.

FIG. 10 is a sequence diagram illustrating a reference example of transmission and receiving of CEC commands between the digital television receiving device 100 and the home theater device 200 during a sound volume adjusting operation by pressing the sound volume operation button once. FIG. 10 illustrates an operation for controlling sound volume adjustment made when a sound volume increasing operation is performed by pressing the sound volume up button once.

The digital television receiving device 100 is set to a theater mode, the current sound volume setting value data is "X", and the amplifier 203 is set to a mute status.

First, when the user 310 presses the sound volume up button in the remote control device 301 once, the digital television receiving device 100 transmits a <User Control Pressed> ["Volume Up"] command to the home theater device 200 (step S101). This command is a command indicating that the user 310 has pressed the sound volume up button.

When the user 310 releases the sound volume up button in the remote control device 301, the digital television receiving device 100 transmits a <User Control Released> command to the home theater device 200 (step S102). This command is a command indicating that the user 310 has released the sound volume operation button.

The home theater device 200 recognizes that the user 310 has pressed the sound volume up button once by the commands received in steps S101 and S102. Thus, the home theater device 200 increases the sound volume setting value data by "1". As a result, the current sound volume setting value data is "X+1".

The digital television receiving device 100 continues to transmit a <Give Audio Status> command to the home theater device 200 to acquire the current sound volume setting value data in the home theater device 200 (step S103). This command is a command for requesting the sound volume status data.

The home theater device 200 transmits a <Report Audio Status> ["Mute Off", X+1] command to the digital television receiving device 100 in response to the command received in step S103 (step S104). This command is a command for notifying a mute release status and sound volume setting value data "X+1" as the sound volume status data.

The digital television receiving device 100 confirms that the current sound volume setting value data is "X+1" based on the sound volume status data received in step S104 while performing sound volume value display by a number based on the sound volume setting value data "X+1" on the screen of the display 103.

If a sound volume decreasing operation is performed by pressing the sound volume down button once, a <User Control Pressed> ["Volume Down"] command is transmitted instead of the <User Control Pressed> ["Volume Up"] command in step S101 from the digital television receiving device to the home theater device. A <Report Audio Status> ["Mute Off", X−1] command is transmitted instead of the <Report Audio Status> ["Mute Off", X+1] command in step S104 from the home theater device to the digital television receiving device. Another operation during the sound volume decreasing operation is similar to an operation during a sound volume increasing operation.

Thus, in the sound volume adjusting operation by single pressing in the reference example, the CEC commands are required to be transmitted and received in four steps to change a sound volume value of the home theater device 200 by "1". Therefore, the responsibility of the sound volume operation becomes lower than that in the sound volume adjusting operation by single pressing illustrated in FIG. 5.

(b) Sound Volume Adjusting Operation by Long Pressing

Figure 11:
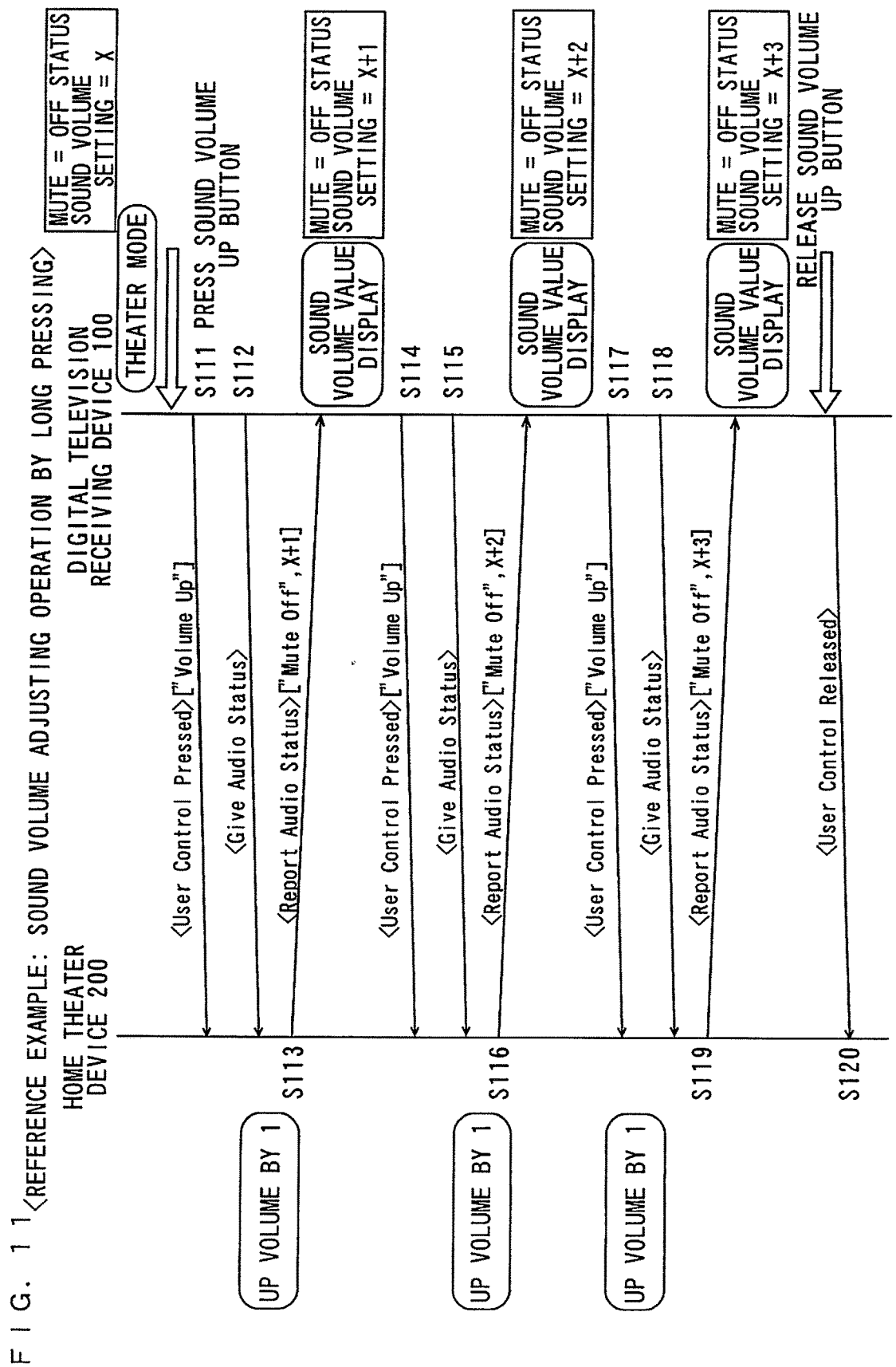
FIG. 11 is a sequence diagram illustrating a reference example of transmission and receiving of CEC commands between the digital television receiving device and the home theater device during a sound volume adjusting operation by pressing the sound volume operation button long.

FIG. 11 is a sequence diagram illustrating a reference example of transmission and receiving of CEO commands between the digital television receiving device 100 and the home theater device 200 during the sound volume adjusting operation by pressing the sound volume operation button long. FIG. 11 illustrates an operation for controlling sound volume adjustment made when a sound volume increasing operation is performed by pressing the sound volume up button long.

The digital television receiving device 100 is set to a theater mode, the current sound volume setting value data is "X", and the amplifier 203 is set to a mute status.

First, when the user 310 presses the sound volume up button in the remote control device 301 long, the digital television receiving device 100 transmits a <User Control Pressed> ["Volume Up"] command to the home theater device 200 (step S111).

In this case, the sound volume up button is pressed long. Thus, the digital television receiving device 100 does not immediately transmit the <User Control Released> command in step S102 illustrated in FIG. 10 to the home theater device 200 but transmits a <Give Audio Status> command to the home theater device 200 (step S112).

The home theater device 200 increases the sound volume setting value data by "1" because it recognizes that the user 310 has pressed the sound volume up button long in steps S111 and S112. As a result, the current sound volume setting value data becomes "X+1".

The home theater device 200 transmits a <Report Audio Status> ["Mute Off", X+1] command to the digital television receiving device 100 (step S113). The digital television receiving device 100 performs sound volume value display based on the sound volume setting value data "X+1".

If the sound volume up button continues to be pressed, the digital television receiving device 100 transmits a <User Control Pressed> ["Volume Up"] command to the home theater device 200 again (step S114).

Processes in steps S115 and S116 are similar to the processes in steps S112 and S113. In step S116, sound volume setting value data "X+2" is transmitted from the home theater device 200 to the digital television receiving device 100. The digital television receiving device 100 performs sound volume value display based on the sound volume setting value data "X+2".

If a long-pressing operation of the sound volume up button is further continued, processes in steps S117, S118 and S119, which are similar to the processes in steps S114, S115 and S116, are performed. In step S119, sound volume setting value data "X+3" is transmitted from the home theater device 200 to the digital television receiving device 100. The digital television receiving device 100 performs sound volume value display based on the sound volume setting value data "X+3".

Thus, during a period of the long-pressing operation of the sound volume up button, the sound volume setting value data is transmitted from the home theater device 200 to the digital television receiving device 100 in steps S113, S116 and S119. Thus, the digital television receiving device 100 can perform sound volume value display based on the sound volume setting value data that changes.

When the user 310 releases the sound volume up button, the digital television receiving device 100 transmits a <User Control Released> command (step S120). Thus, an operation for controlling an increase in the sound volume of the home theater device 200 ends.

Thus, in the sound volume adjusting operation by long pressing in the reference example, the CEC commands are required to be transmitted and received in three steps to change the sound volume value of the home theater device 200 by "1". It is required to be confirmed whether the <User Control Released> command has been received for the home theater device 200 to determine whether the sound volume operation is a long pressing operation or a single pressing operation. Thus, the speed of the sound volume adjustment by long pressing decreases.

Further, the digital television receiving device 100 is required to acquire the CEC command including the sound volume setting value data from the home theater device 200 for each transmission of the <User Control Pressed> ["Volume Up"] command to perform the sound volume value display on the screen of the display 103 based on the sound volume setting value data in the home theater device 200. Thus, the speed of the sound volume value display decreases. In this case, when the user 310 gives priority to the speed of the sound volume operation, the sound volume value display changes later than the change in the sound volume of audio actually output from the speakers 311 to 316, or the change in the sound volume value display becomes discontinuous. In order to match the change in the sound volume value display with the sound volume operation, the user 310 is required to make the speed of the sound volume operation lower. Thus, operability during the sound volume operation is deteriorated.

Thus, in the sound volume adjusting operation by long pressing in the reference example, the number of times of transmission and receiving of the CEC commands for adjusting the sound volume of the home theater device 200 increases. Therefore, responsibility becomes lower than that in the sound volume adjusting operation by long pressing illustrated in FIGS. 6 and 7.

(c) Mute Setting Operation

Figure 12:
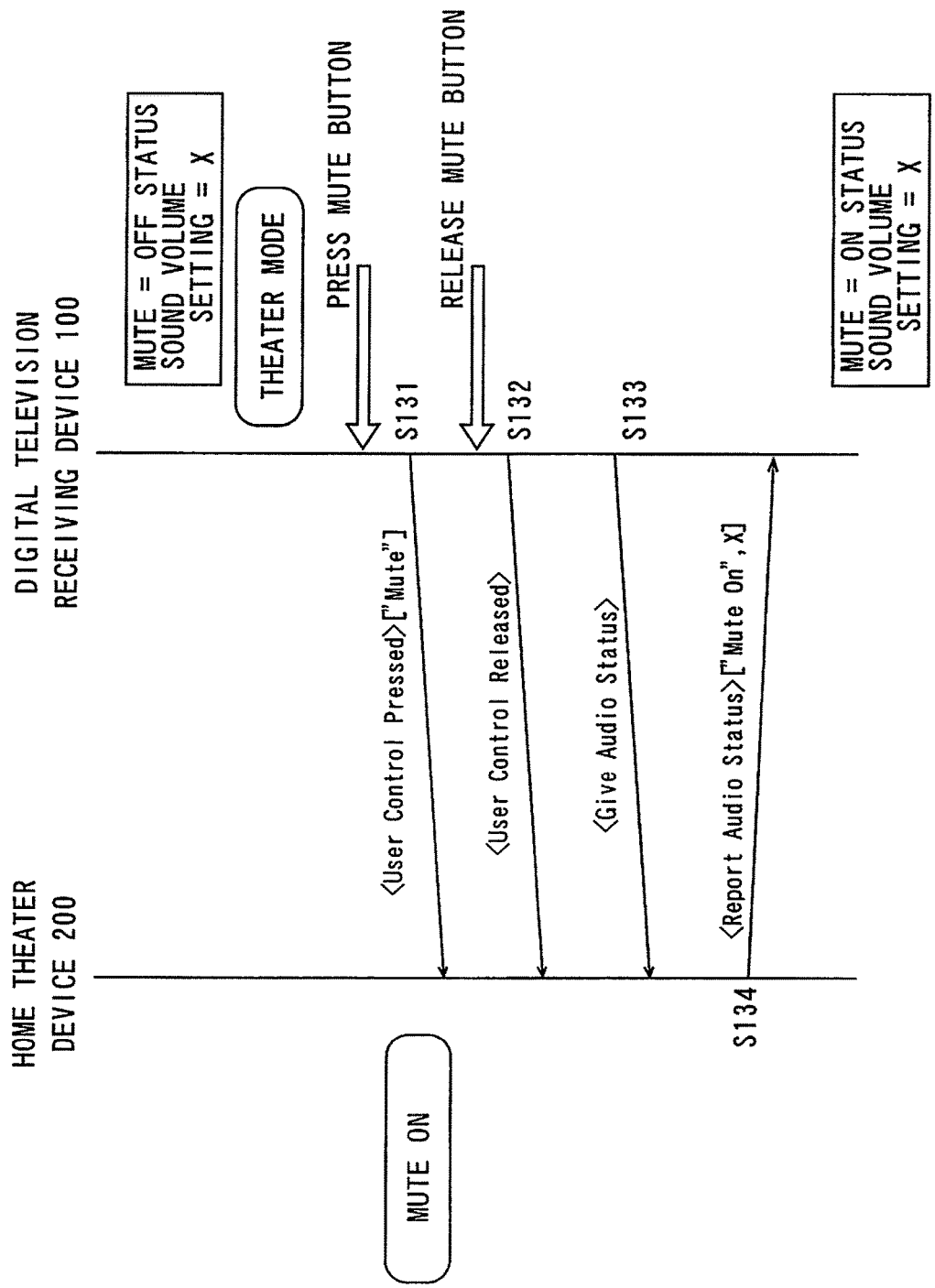
FIG. 12 is a sequence diagram illustrating a reference example of transmission and receiving of CEC commands between the digital television receiving device and the home theater device during a mute setting operation.

FIG. 12 is a sequence diagram illustrating a reference example of transmission and receiving the CEC commands between the digital television receiving device 100 and the home theater device 200 during the mute setting operation.

FIG. 12 illustrates an operation for controlling mute setting performed when the mute setting operation is performed with the mute button.

When the user 310 presses the mute button in the remote control device 301, the digital television receiving device 100 transmits a <User Control Pressed> ["Mute"] command to the home theater device 200 (step S131). This command is a command indicating that the user 310 has pressed the mute button.

When the user 310 immediately releases the mute button, the digital television receiving device 100 transmits a <User Control Released> command to the home theater device 200 (step S132).

The home theater device 200 recognizes that the user 310 has pressed the mute button once with the commands received in steps S131 and S132. Thus, the home theater device 200 sets the amplifier 203 to a mute status.

The digital television receiving device 100 continues to transmit a <Give Audio Status> command to the home theater device 200 to acquire the current sound volume setting value data in the home theater device 200 (step S103).

The home theater device 200 transmits a <Report Audio Status> ["Mute On", X] command to the digital television receiving device 100 in response to the command received in step S133 (step S134). This command is a command for notifying a mute setting status and the sound volume setting value data "X" as the sound volume status data.

Thus, in the mute setting operation in the reference example, the CEC commands are required to be transmitted and received in four steps to set the home theater device 200 to the mute status. Thus, it takes longer to perform the mute setting than that in the mute setting operation illustrated in FIG. 8.

(4) Third Embodiment

Figure 13:
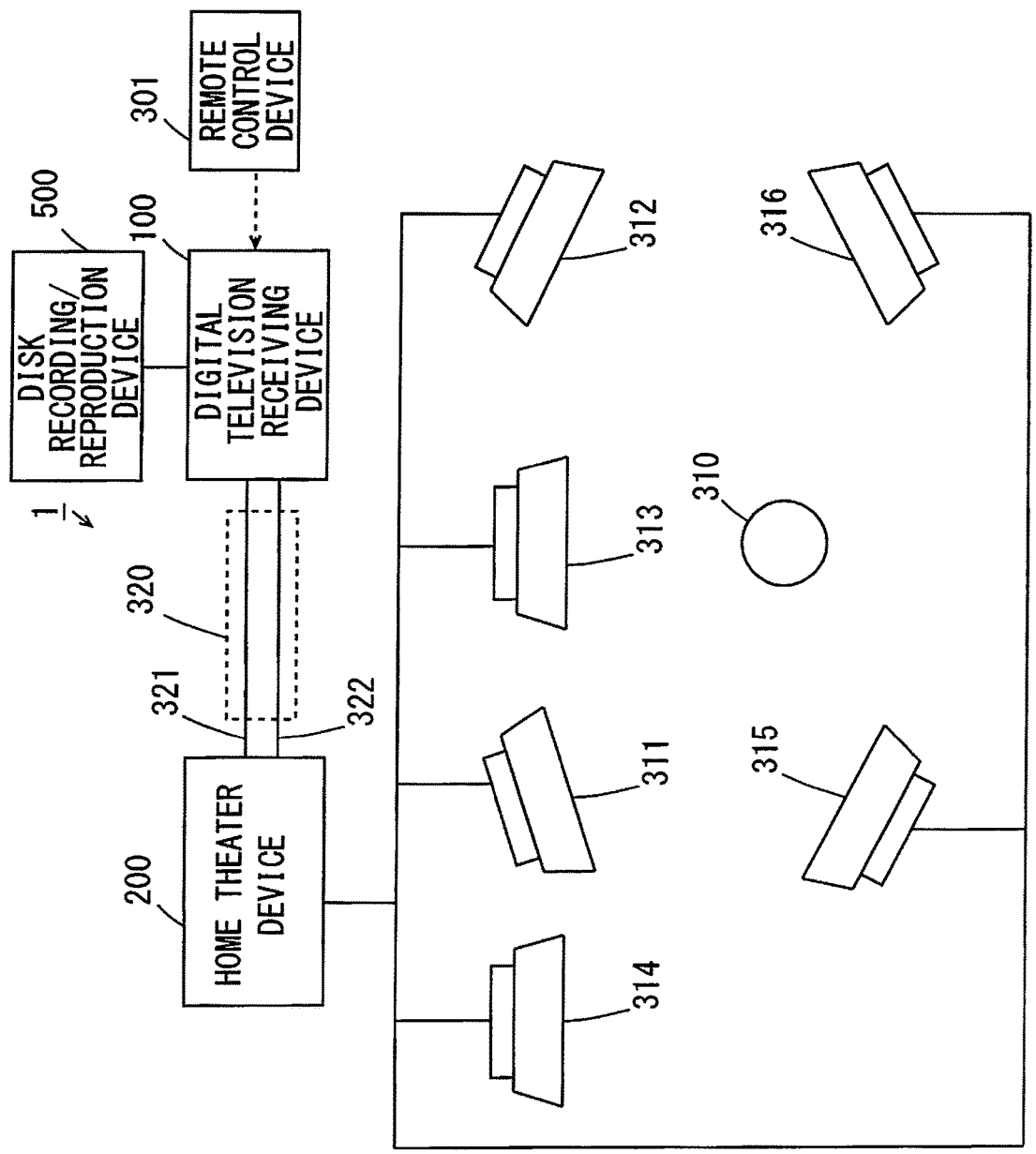
FIG. 13 is a block diagram illustrating a configuration of a home theater system according to a third embodiment of the present invention.

FIG. 13 is a block diagram illustrating a configuration of a home theater system 1 according to a third embodiment of the present invention.

The home theater system 1 illustrated in FIG. 13 differs from the home theater system 1 illustrated in FIG. 1 in the following points. In the home theater system 1 illustrated in FIG. 13, a disk recording/reproduction device 500 is connected to a digital television receiving device 100. The disk recording/reproduction device 500 includes an HDMI transmitter/receiver 105, a CPU 106 and a remote control light receiver 108 in the digital television receiving device 100 illustrated in FIG. 2, and does not include a display 103, an audio outputor 104, and a memory 107. The disk recording/reproduction device 500 includes a disk recording/reproduction unit instead of a tuner 101 and a decoder 102 as a content supply source 110. The disk recording/reproducer is configured to make video data and audio data recordable as contents in a disk such as a CD (Compact Disk), a DVD (Digital Versatile Disk), or a hard disk and make video data and audio data, which have been recorded in the disk, reproducible.

In the home theater system 1 according to the present embodiment, the disk recording/reproduction device 500 is used as an audio data acquisitor in an audio/video reproduction device, and a portion, excluding the content supply source 110 and the display 103, of the digital television receiving device 100 is used as a portion, excluding the audio data acquisitor, of the audio/video reproduction device. The home theater device 200 is used as an audio output control device, and the display 103 in the digital television receiving device 100 is used as a display.

An input source of the digital television receiving device 100 is switchable to digital television broadcasting and the digital recording/reproduction device 500. An operation performed when the input source of the digital television receiving device 100 is switched to the disk recording/reproduction device 500 will be described below.

In this case, video data reproduced by the disk recording/reproduction device 500 is displayed as video on the display 103 (see FIG. 2) in the digital television receiving device 100.

If the digital television receiving device 100 is set to a television mode, audio data reproduced by the disk recording/reproduction device 500 is output as audio by the audio outputor 104 (see FIG. 2) in the digital television receiving device 100.

If the digital television receiving device 100 is set to a theater mode, audio data reproduced by the disk recording/reproduction device 500 is transmitted from the digital television receiving device 100 to the home theater device 200. In this case, transmission and receiving of CEC commands between the digital television receiving device 100 and the home theater device 200 are similar to those in the first or second embodiment.

In the present embodiment, current sound volume control status data in the home theater device 200 is stored in a memory 107 in the digital television receiving device 100. Sound volume bar display is performed on a screen of the display 103 in the digital television receiving device 100 based on sound volume control status data stored in the memory 107 by a control operation of the CPU 106 in the digital television receiving device 100.

In the home theater system 1 according to the present embodiment, if audio based on the audio data reproduced by the disk recording/reproduction device 500 is output from speakers 311 to 316, the operability and the responsibility of a sound volume operation are improved while high-precision sound volume adjustment can be made.

(5) Fourth Embodiment

Figure 14:
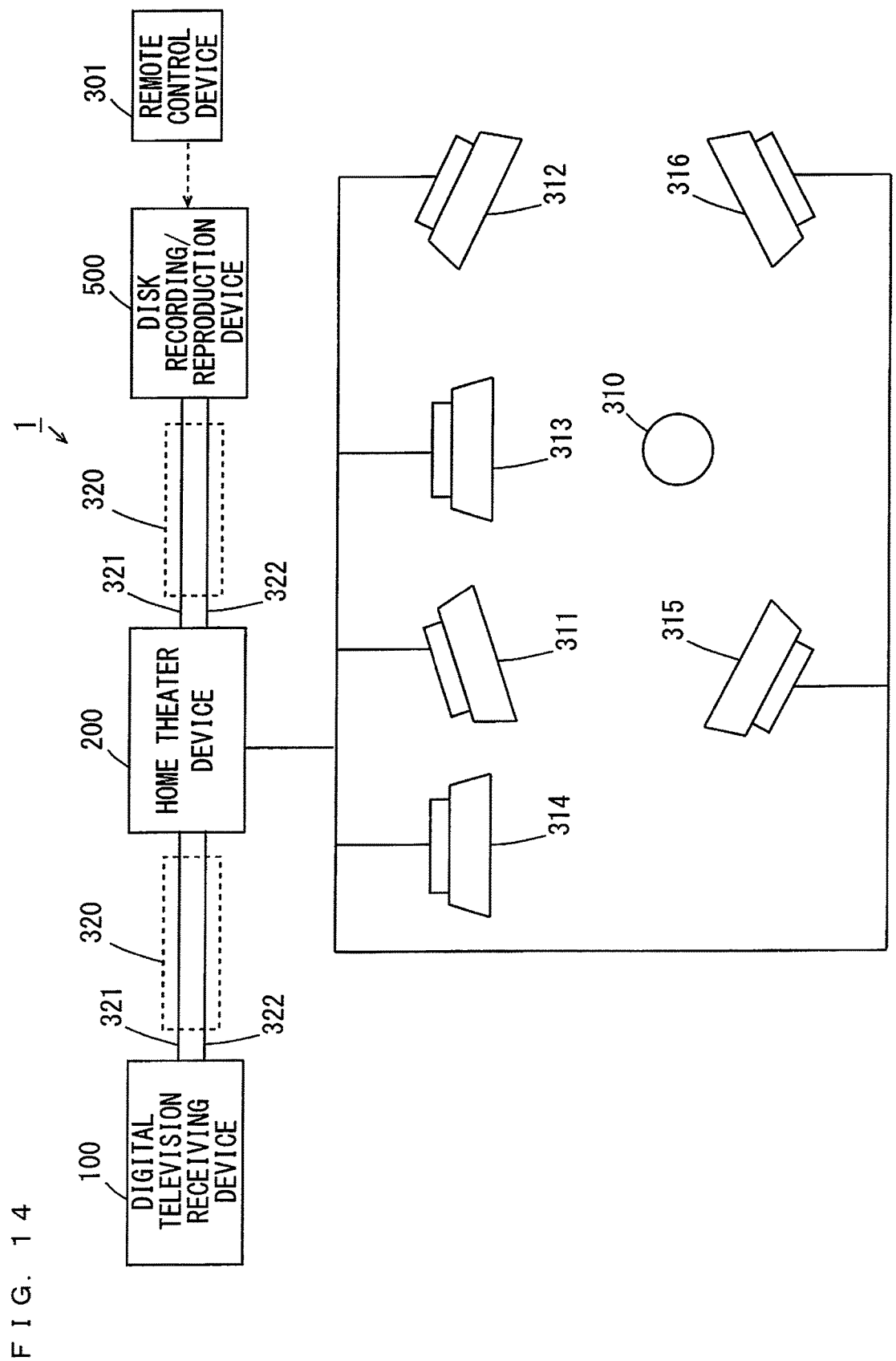
FIG. 14 is a block diagram illustrating a configuration of a home theater system according to a fourth embodiment of the present invention.

FIG. 14 is a block diagram illustrating a configuration of a home theater system 1 according to a fourth embodiment of the present invention.

The home theater system 1 illustrated in FIG. 14 differs from the home theater system 1 illustrated in FIG. 1 in the following points. In the home theater system 1 illustrated in FIG. 14, a home theater device 200 is connected to a disk recording/reproduction device 500 via an HDMI cable 320. A configuration of the disk recording/reproduction device 500 is similar to the configuration of the disk recording/reproduction device 500 in the third embodiment. The disk recording/reproduction device 500 is settable to a normal reproduction mode and a theater mode. A digital television receiving device 100 is connected to the home theater device 200 via an HDMI cable 320.

In the home theater system 1 according to the present embodiment, the disk recording/reproduction device 500 is used as an audio/video reproduction device, the home theater device 200 is used as an audio output control device, and a display 103 in the digital television receiving device 100 is used as a display.

Video data reproduced by the disk recording/reproduction device 500 illustrated in FIG. 14 is transmitted to the digital television receiving device 100 via the HDMI cable 320, the home theater device 200 and the HDMI cable 320. Video data received by the digital television receiving device 100 is displayed as video on the display 103 (see FIG. 2).

If the disk recording/reproduction device 500 is set to a normal reproduction mode, audio data reproduced by the disk recording/reproduction device 500 is transmitted to the digital television receiving device 100 via the HDMI cable 320, the home theater device 200 and the HDMI cable 320.

Audio data received by the digital television receiving device 100 is output as audio by the audio outputor 104 (see FIG. 2).

If the disk recording/reproduction device 500 is set to a theater mode, the audio data reproduced by the disk recording/reproduction device 500 is transmitted to the home theater device 200 from the digital television receiving device 100 via the HDMI cable 320. The audio data received by the home theater device 200 is output as audio from speakers 311 to 316. In this case, transmission and receiving of CEC commands between the disk recording/reproduction device 500 and the home theater device 200 are similar to the transmission and receiving of the CEC commands between the digital television receiving device 100 and the home theater device 200 in the first or second embodiment.

In the present embodiment, current sound volume control status data in the home theater device 200 is stored in a memory 107 in the disk recording/reproduction device 500. Sound volume bar display is performed on the screen of the display 103 in the digital television receiving device 100 based on the sound volume control status data stored in the memory 107 by a control operation of a CPU 106 in the disk recording/reproduction device 500.

In the home theater system 1 according to the present embodiment, if audio based on the audio data reproduced by the disk recording/reproduction device 500 is output from speakers 311 to 316, the operability and the responsibility of a sound volume operation are improved while high-precision sound volume adjustment can be made.

(6) Other Embodiments

While the digital television receiving device 100 and the home theater device 200 are connected to each other via the HDMI cable 320 as a communication medium in the first, second, and third embodiments, the present invention is not limited to this. For example, the digital television receiving device 100 and the home theater device 200 may transmit and receive CEC commands via wireless communication. The digital television receiving device 100 and the home theater device 200 may be connected to each other via a network such as a wireless or wired Ethernet.

Similarly, the disk recording/reproduction device 500 and the home theater device 200 may transmit and receive CEC commands via wireless communication in the fourth embodiment. The disk recording/reproduction device 500 and the home theater device 200 may be connected to each other via a network such as a wireless or wired Ethernet. Further, the home theater device 200 and the digital television receiving device 100 may be connected to each other via an analog communication wire.

While the CPU 106 and the memory 107 implement a sound volume control function in the above-mentioned first to fifth embodiments, the present invention is not limited to this. The CPU 106 and the memory 107 may be used to implement another function of the digital television receiving device 100 in addition to the sound volume control function.

While the adjustable range bar 402 and the sound volume bar 403 have a linear shape in the above-mentioned first to fifth embodiments, the adjustable range bar 402 and the sound volume bar 403 may have a curved shape.

(7) Correspondences Between Elements in the Claims and Parts in Embodiments

In the following paragraphs, non-limiting examples of correspondences between various elements recited in the claims below and those described above with respect to various preferred embodiments of the present invention are explained.

In the first and second embodiments, the digital television receiving device 100 (excluding the display 103) is an example of an audio/video reproduction device, the display 103 in the digital television receiving device 100 is an example of a display, the content supply source 110 is an example of an audio data acquisitor, the remote control light receiver 108 is an example of a sound volume operation information acquisitor, the HDMI transmitter/receiver 105 is an example of a first transmitter/receiver (or a transmitter/receiver), the memory 107 is an example of a storage, and the CPU 106 is an example of a first controller (or a controller).

In the third embodiment, the digital television receiving device 100 (excluding the display 103 and the content supply source 110) is an example of an audio/video reproduction device, the display 103 in the digital television receiving device 100 is an example of a display, the disk recording/reproduction device 500 is an example of an audio data acquisitor, the remote control light receiver 108 in the digital television receiving device 100 is an example of a sound volume operation information acquisitor, the HDMI transmitter/receiver 105 in the digital television receiving device 100 is an example of a first transmitter/receiver (or a transmitter/receiver), the memory 107 in the digital television receiving device 100 is an example of a storage, and the CPU 106 in the digital television receiving device 100 is an example of a first controller (or a controller).

In the fourth embodiment, the disk recording/reproduction device 500 is an example of an audio/video reproduction device, the display 103 in the digital television receiving device 100 is an example of a display, the content supply source in the disk recording/reproduction device 500 is an example of an audio data acquisitor, the remote control light receiver 108 in the disk recording/reproduction device 500 is an example of a sound volume operation information acquisitor, the HDMI transmitter/receiver 105 in the disk recording/reproduction device 500 is an example of a first transmitter/receiver (or a transmitter/receiver), the memory 107 in the disk recording/reproduction device 500 is an example of a storage, and the CPU 106 in the disk recording/reproduction device 500 is an example of a first controller (or a controller).

In the first to fourth embodiments, the home theater device 200 is an example of an audio output control device, and the HDMI cable 320 is an example of a communication medium. The HDMI transmitter/receiver 205 in the home theater device 200 is an example of a second transmitter/receiver (or a transmitter/receiver), the amplifier 203 is an example of an amplifier, the CPU 204 is an example of a second controller (or a controller), and the sound volume operator 201 is an example of a sound volume operator.

The CEC command is an example of a command, the adjustable range bar 402 is an example of a first bar, and the sound volume bar 403 is an example of a second bar.

As each of various elements recited in the claims, various other elements having configurations or functions described in the claims can be also used.

[Industrial Applicability]

The present invention is applicable to various home theater systems capable of stereophonic reproduction of audio.

The invention claimed is:

1. An audio/video reproduction device to be connected to an audio output control device via a communication medium and to be connected to a display, the audio/video reproduction device comprising:
   an audio data acquisitor that acquires audio data;
   a transmitter/receiver that transmits the audio data acquired by said audio data acquisitor to said audio output control device, and transmits and receives a command to and from said audio output control device;
   a controller that controls said display and said transmitter/receiver, and
   a built-in speaker to output a sound,
   wherein said audio/video reproduction device includes a first mode in which audio is output from said built-in speaker, and a second mode in which audio is output from the external speaker via said audio output control device,
   when said audio/video reproduction device is set to the second mode, said controller transmits, to said audio output control device via said transmitter/receiver, sound volume control status data,
   when the sound volume control status data is received by said audio output control device, the sound volume control status data of said audio output control device is updated to be same as the received sound volume control status data, and the updated sound volume control status data relating to said audio output control device is transmitted to said audio/video reproduction device,
   when the updated sound volume control status data is received by said transmitter/receiver, the updated sound volume control status data of said audio output control device is saved in the controller, such that the saved updated sound volume control status data is reflected when said audio/video reproduction device switches back to the first mode,
   the sound volume control status data includes maximum sound volume value data representing a maximum value in a sound volume adjustable range of said audio output control device, sound volume setting value data representing a sound volume of said audio output control device, and a mute status information indicating whether said audio output control device is set to a mute status,
   said controller receives the sound volume control status data from said audio output control device via said transmitter/receiver, and controls said display to display a ratio of a current sound volume of said audio output control device to the maximum value in the sound volume adjustable range of said audio output control device based on the received sound volume control status data, and
   the maximum value indicated on a visual interface corresponding to the sound volume adjustable range of said audio output control device in the second mode is different from a maximum value indicted on a visual interface corresponding to a sound adjustable range of said built-in speaker by said audio/video reproduction device in the first mode.

2. A television device to be connected to an audio output control device via a communication medium and to be connected to a display, the television device comprising:
   an audio data acquisitor that acquires audio data;
   a transmitter/receiver that transmits the audio data acquired by said audio data acquisitor to said audio output control device, and transmits and receives a command to and from said audio output control device;
   a controller that controls said display and said transmitter/receiver, and
   a built-in speaker to output a sound,
   wherein said television device includes a first mode in which audio is output from said built-in speaker, and a second mode in which audio is output from the external speaker via said audio output control device,
   when said television device is set to the second mode, said controller transmits, to said audio output control device via said transmitter/receiver, sound volume control status data,
   when the sound volume control status data is received by said audio output control device, the sound volume control status data of said audio output control device is updated to be same as the received sound volume control status data, and the updated sound volume control status data relating to said audio output control device is transmitted to said television device,
   when the updated sound volume control status data is received by said transmitter/receiver, the updated sound volume control status data of said audio output control device is saved in the controller, such that the saved updated sound volume control status data is reflected when said television device switches back to the first mode,
   the sound volume control status data includes maximum sound volume value data representing a maximum value in a sound volume adjustable range of said audio output control device, sound volume setting value data representing a sound volume of said audio output control device, and a mute status information indicating whether said audio output control device is set to a mute status,
   said controller receives the sound volume control status data from said audio output control device via said transmitter/receiver, and controls said display to display a ratio of a current sound volume of said audio output control device to the maximum value in the sound volume adjustable range of said audio output control device based on the received sound volume control status data, and
   the maximum value indicated on a visual interface corresponding to the sound volume adjustable range of said audio output control device in the second mode is different from a maximum value indicted on a visual interface corresponding to a sound adjustable range of said built-in speaker by said television device in the first mode.

3. A sound volume control method for controlling, in an audio/video reproduction device connected to an audio output control device via a communication medium while being connected to a display, a sound volume of said audio output control device,
   said audio/video reproduction device includes a first mode in which audio is output from said built-in speaker, and a second mode in which audio is output from the external speaker via said audio output control device,
   the sound volume control method comprising the steps of:
   acquiring audio data;
   transmitting said acquired audio data to said audio output control device; and
   transmitting, to said audio output control device, sound volume control status data, when said audio/video reproduction device is set to the second mode;

wherein when the sound volume control status data is received by said audio output control device, the sound volume control status data of said audio output control device is updated to be same as the received sound volume control status data, and the updated sound volume control status data relating to said audio control device is transmitted to said audio/video reproduction device; and the sound volume control method further comprising the steps of:

saving, when the updated sound volume control status data is received, the updated sound volume control status data of said audio output control device, such that the saved updated sound volume control status data is reflected when said audio/video reproduction device switches back to the first mode;

wherein the sound volume control status data including maximum sound volume value data representing a maximum value in a sound volume adjustable range of said audio output control device, sound volume setting value data representing a sound volume of said audio output control device, and a mute status information indicating whether said audio output control device is set to a mute status, the sound volume control method further comprising the steps of:

receiving the sound volume control status data from said audio output control device; and controlling said display to display a ratio of a current sound volume of said audio output control device to the maximum value in the sound volume adjustable range of said audio output control device based on the received sound volume control status data, wherein the maximum value indicated on a visual interface corresponding to the sound volume adjustable range of said audio output control device in the second mode is different from a maximum value indicted on a visual interface corresponding to a sound adjustable range of said built-in speaker by said audio/video reproduction device in the first mode.

* * * * *